US012581474B2

(12) United States Patent
Yu et al.

(10) Patent No.: US 12,581,474 B2
(45) Date of Patent: Mar. 17, 2026

(54) METHOD FOR DETERMINING INITIALIZATION STATE OF SCRAMBLING CODE SEQUENCE AND APPARATUS

(71) Applicant: HUAWEI TECHNOLOGIES CO., LTD., Guangdong (CN)

(72) Inventors: Jian Yu, Shenzhen (CN); Yunbo Li, Shenzhen (CN); Mengshi Hu, Shenzhen (CN); Chenchen Liu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 18/490,529

(22) Filed: Oct. 19, 2023

(65) Prior Publication Data

US 2024/0057059 A1 Feb. 15, 2024

Related U.S. Application Data

(63) Continuation of application No. PCT/CN2022/086895, filed on Apr. 14, 2022.

(30) Foreign Application Priority Data

Apr. 20, 2021 (CN) .......................... 202110426855.0

(51) Int. Cl.
*H04L 5/00* (2006.01)
*H04L 27/26* (2006.01)
(Continued)

(52) U.S. Cl.
CPC ....... *H04W 72/0466* (2013.01); *H04L 5/0048* (2013.01)

(58) Field of Classification Search
CPC ..... H04L 1/0057; H04L 1/06; H04L 27/2602; H04L 69/323; H04L 1/0045;
(Continued)

(56) References Cited

U.S. PATENT DOCUMENTS

| 7,054,296 B1* | 5/2006 | Sorrells .................. H04B 1/406 |
| | | 370/480 |
| 8,270,600 B2* | 9/2012 | Kishiyama ........ H04L 25/03866 |
| | | 380/34 |

(Continued)

OTHER PUBLICATIONS

IEEE P802.11be™/D0.02,Part 11: Wireless LAN Medium Access Control (MAC) and Physical Layer (PHY) Specifications,Amendment 8: Enhancements for extremely high throughput (EHT),Dec. 2020,total 409 pages.

(Continued)

*Primary Examiner* — Sai Aung
(74) *Attorney, Agent, or Firm* — WOMBLE BOND DICKINSON (US) LLP

(57) ABSTRACT

A receiving device is disclosed that receives a non-EHT PPDU that includes a service field and that is sent by a sending device, where the service field includes a first field whose bit quantity is m, and m≥1; and the receiving device determines, based on the first field, an initialization state of a scrambling code sequence corresponding to an extremely-high throughput physical layer protocol data unit EHT PPDU, where a bit quantity of the initialization state of the scrambling code sequence is greater than the bit quantity of the first field.

20 Claims, 13 Drawing Sheets

(51) Int. Cl.
   *H04L 69/324*       (2022.01)
   *H04W 72/04*        (2023.01)
   *H04W 72/044*      (2023.01)

(58) Field of Classification Search
   CPC ... H04L 1/0631; H04L 25/03866; H04L 1/08;
                  H04L 1/0061; H04L 27/2617
   See application file for complete search history.

(56)             References Cited

U.S. PATENT DOCUMENTS

| | | | | |
|---|---|---|---|---|
| 10,313,044 | B2 * | 6/2019 | Wang | H04J 11/00 |
| 2012/0314869 | A1 | 12/2012 | Zhang et al. | |
| 2014/0328435 | A1 * | 11/2014 | You | H04L 1/0071 |
| | | | | 375/295 |
| 2015/0282183 | A1 * | 10/2015 | Sverdlov | H04L 25/03866 |
| | | | | 370/329 |
| 2019/0165890 | A1 * | 5/2019 | Pietraski | H04L 5/0094 |
| 2020/0252156 | A1 * | 8/2020 | Lomayev | H04L 1/0041 |
| 2021/0050952 | A1 * | 2/2021 | Noh | H04L 1/189 |
| 2021/0266204 | A1 * | 8/2021 | Chen | H04L 27/2634 |
| 2021/0329642 | A1 | 10/2021 | Chen et al. | |
| 2023/0134261 | A1 * | 5/2023 | Handte | H04L 5/0094 |
| | | | | 370/329 |

OTHER PUBLICATIONS

IEEE P802.11ax ™—2021, Part 11: Wireless LAN Medium Access Control(MAC) and Physical Layer (PHY) Specifications,Amendment 1: Enhancements for High Efficiency WLAN,Feb. 9, 2021,total 37 pages.

IEEE Std 802.11a—1999, Part 11: Wireless LAN Medium Access Control (MAC) and Physical Layer (PHY) specifications: High-speed Physical Layer in the 5 GHZ Band, Sep. 16, 1999,total 90 pages.

IEEE Std 802.11b—1999/Cor 1—2001,Part 11: Wireless LAN Medium Access Control (MAC) and Physical Layer (PHY) specifications Amendment 2: Higher-speed Physical Layer (PHY),extension in the 2.4 GHz band—Corrigendum 1,Nov. 7, 2001,total 24 pages.

IEEE Std 802.11g™—2003, Part 11: Wireless LAN Medium Access Control (MAC) and Physical Layer (PHY) specifications,Amendment 4: Further Higher Data Rate Extension in the 2.4 GHz Band,Jun. 27, 2003,total 78 pages.

IEEE Std 802.11n™—2009, Part 11: Wireless LAN Medium Access Control (MAC) and Physical Layer (PHY) specifications,Amendment 5:Enhancements for Higher Throughput,Oct. 29, 2009,total 536 pages.

IEEE Std 802.11ac™—2013, Part 11: Wireless LAN Medium Access Control (MAC) and Physical Layer (PHY) Specifications,Amendment 4: Enhancements for Very High Throughput for Operation in Bands below 6 GHz,Dec. 11, 2013,total 425 pages.

802.11—2016, Part 11: Wireless LAN Medium Access Control (MAC) and Physical Layer (PHY) Specifications,Dec. 7, 2016,total 3534 pages.

Lin Yang et al:"Remaining Issues with New 11be Scrambler",Jul. 21, 2020, IEEE 802.11-20/1107r0, total 7 pages.

* cited by examiner

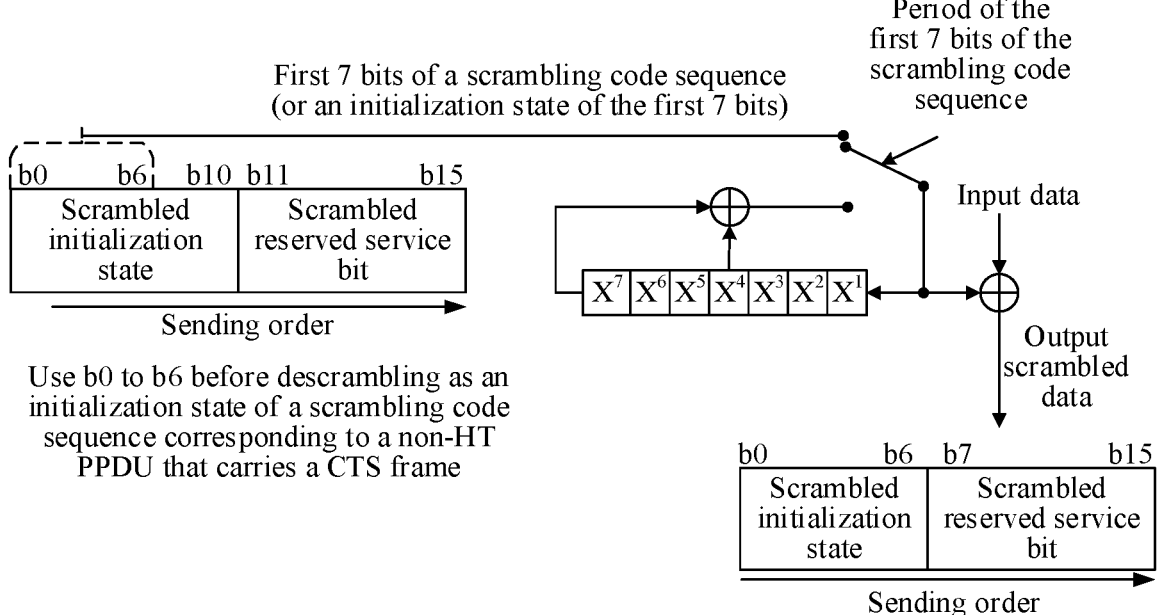

First 7 bits of a scrambling code sequence
(or an initialization state of the first 7 bits)

Period of the
first 7 bits of the
scrambling code
sequence

Input data

Output
scrambled
data b0        b6       b10 b11              b15

| Scrambled initialization state | Scrambled reserved service bit |

Sending order

Use b0 to b6 before descrambling as an
initialization state of a scrambling code
sequence corresponding to a non-HT
PPDU that carries a CTS frame $X^7$ $X^6$ $X^5$ $X^4$ $X^3$ $X^2$ $X^1$ b0            b6   b7            b15

| Scrambled initialization state | Scrambled reserved service bit |

Sending order

FIG. 7

Access point
device 1

Access point
device 2

Station
device 1

Station
device 2

FIG. 8

METHOD FOR DETERMINING INITIALIZATION STATE OF SCRAMBLING CODE SEQUENCE AND APPARATUS

CROSS-REFERENCE TO RELATED APPLICATIONS

This application is a continuation of International Patent Application No. PCT/CN2022/086895, filed on Apr. 14, 2022, which claims priority to Chinese Patent Application No. 202110426855.0, filed on Apr. 20, 2021. The disclosures of the aforementioned applications are hereby incorporated by reference in their entireties.

TECHNICAL FIELD

This application relates to the field of communication technologies, and in particular, to a method for determining an initialization state of a scrambling code sequence and an apparatus.

BACKGROUND

An existing wireless local area network (WLAN) communication system starts from the 802.11a/b/g standard, and has undergone a plurality of generations, such as the 802.11n standard, the 802.11ac standard, the 802.11ax standard, and the 802.11be standard. Based on the foregoing standards, communication apparatuses may communicate with each other by using a physical layer protocol data unit (PPDU). A PPDU corresponding to the 802.11be standard may be described as an extremely-high throughput (EHT) PPDU, and a PPDU corresponding to a non-802.11be standard may be described as a non-EHT PPDU.

In the communication system, to facilitate extraction of a clock signal from a line signal, it is necessary to avoid consecutive "0"s and consecutive "1"s. The communication apparatus may scramble an information bit stream, in other words, perform an exclusive-OR operation on a to-be-sent information bit stream and another pseudo-random sequence (which may also be described as a scrambling code sequence), and encode an exclusive-OR result to generate a PPDU for sending.

For example, the communication apparatus may determine an initialization state of the scrambling code sequence, and perform cyclic shift processing by using the initialization state of the scrambling code sequence as an initial value of a cyclic shift register, to obtain the scrambling code sequence.

Currently, initialization states of scrambling code sequences corresponding to the non-802.11be standard are all 7 bits, and an initialization state of a scrambling code sequence corresponding to the 802.11be standard is 11 bits. When a plurality of communication apparatuses receive non-EHT PPDUs and simultaneously send EHT PPDUs at a same frequency based on the non-EHT PPDUs, scrambling code sequences corresponding to the EHT PPDUs sent by the plurality of communication apparatuses need to be completely the same to ensure communication reliability. That is, initialization states of the scrambling code sequences used by the plurality of communication apparatuses need to be completely the same. Therefore, how the plurality of communication apparatuses determine, based on the non-EHT PPDUs, the initialization states of the scrambling code sequences corresponding to the EHT PPDUs becomes an urgent problem to be resolved.

SUMMARY

In view of this, embodiments of this application provide a method for determining an initialization state of a scrambling code sequence and an apparatus, to resolve a technical problem that a plurality of communication apparatuses cannot determine, based on a non-extremely-high throughput physical layer protocol data unit non-EHT PPDU, an initialization state of a scrambling code sequence corresponding to an EHT PPDU.

According to a first aspect, an embodiment of this application provides a method for determining an initialization state of a scrambling code sequence. The method includes: A receiving device receives a non-EHT PPDU that includes a service field and that is from a sending device, where the service field includes a first field whose bit quantity is m, and $m \geq 1$; and the receiving device determines, based on the first field, an initialization state of a scrambling code sequence corresponding to an extremely-high throughput physical layer protocol data unit EHT PPDU, where a bit quantity of the initialization state of the scrambling code sequence is greater than the bit quantity of the first field.

Based on the first aspect, all a plurality of receiving devices may determine, based on first fields in service fields of received non-EHT PPDUs, initialization states of scrambling code sequences corresponding to EHT PPDUs, so that the plurality of receiving devices may use same bits as the initialization states of the scrambling code sequences when simultaneously sending the EHT PPDUs at a same frequency, thereby ensuring that the scrambling code sequences corresponding to the EHT PPDUs sent by the plurality of receiving devices are completely the same, reducing mutual interference between signals, and further enabling multi-AP channel detection and multi-AP joint transmission.

In a possible design, the receiving device obtains a second field, and determines the initialization state of the scrambling code sequence corresponding to the EHT PPDU based on the first field and the second field, where a bit quantity of the second field is a difference between the bit quantity of the initialization state of the scrambling code sequence and the bit quantity of the first field.

Based on this possible design, the receiving device may determine, based on the first field and the second field, the initialization state of the scrambling code sequence corresponding to the EHT PPDU. A feasible solution is provided for the receiving device to determine the initialization state of the scrambling code sequence corresponding to the EHT PPDU.

In a possible design, the first field is $1^{st}$ bit to an $m^{th}$ bit of the service field.

Based on this possible design, the first field may be the first m bits of the service field, and a feasible solution is provided for the receiving device to determine the first field.

In a possible design, the second field is preconfigured.

In a possible design, the bit quantity of the initialization state of the scrambling code sequence is n, and the second field is an $(m+1)^{th}$ bit to an $n^{th}$ bit of the service field.

Based on the foregoing two possible designs, the second field may be preconfigured, or may be the $(m+1)^{th}$ bit to the $n^{th}$ bit of the service field. This is not limited. A plurality of feasible solutions are provided for the receiving device to obtain the second field.

In a possible design, the second field is carried in the non-EHT PPDU.

In a possible design, the second field is carried in one or more of the following information of the non-EHT PPDU: a preamble, a media access control MAC frame, and a trigger frame.

Based on the foregoing two possible designs, a manner in which the receiving device obtains the second field may be more flexible, and randomness of sending bits in the EHT PPDU is increased, thereby reducing a PAPR.

In a possible design, the bit quantity of the initialization state of the scrambling code sequence is n, and the second field is n–m bits in m bits of the first field, where m≥n–m.

Based on this possible design, the receiving device may alternatively determine the second field based on the first field. Compared with the foregoing process of carrying the second field to the non-EHT PPDU, this manner can reduce signaling overheads of the non-EHT PPDU.

In a possible design, the bit quantity of the first field is 7.

Based on this possible design, the first field may be the first 7 bits of the service field of the non-EHT PPDU, that is, the first field may be an initialization state of a scrambling code sequence corresponding to the non-EHT PPDU. The receiving device determines, based on the first field, the initialization state of the scrambling code sequence corresponding to the EHT PPDU, to ensure that the initialization state of the scrambling code sequence corresponding to the EHT PPDU is a non-all-0 value, thereby improving validity of the scrambling code sequence.

In a possible design, the bit quantity of the initialization state of the scrambling code sequence is 11.

In a possible design, the receiving device determines the scrambling code sequence based on the initialization state of the scrambling code sequence, performs scrambling processing based on the scrambling code sequence to generate the EHT PPDU, and sends the EHT PPDU.

Based on this possible design, when the plurality of receiving devices simultaneously send the EHT PPDUs at the same frequency, the plurality of receiving devices may generate same scrambling code sequences by using same initialization states, to ensure that the plurality of receiving devices simultaneously send same EHT PPDUs at the same frequency, thereby reducing interference between signals and improving communication reliability.

According to a second aspect, an embodiment of this application provides a receiving device. The receiving device can implement a function performed by the receiving device in the first aspect or the possible design of the first aspect. The function may be implemented by executing corresponding software by hardware. The hardware or the software includes one or more modules corresponding to the functions, for example, a transceiver module and a processing module. The transceiver module is configured to receive, from a sending device, a non-EHT PPDU that includes a service field, where the service field includes a first field whose bit quantity is m, and m≥1. The processing module is configured to determine an initialization state of a scrambling code sequence corresponding to an extremely-high throughput physical layer protocol data unit EHT PPDU based on the first field, where a bit quantity of the initialization state of the scrambling code sequence is greater than the bit quantity of the first field.

In a possible design, the transceiver module is further configured to obtain a second field, where a bit quantity of the second field is a difference between the bit quantity of the initialization state of the scrambling code sequence and the bit quantity of the first field. The processing module is further configured to determine the initialization state of the scrambling code sequence corresponding to the EHT PPDU based on the first field and the second field.

In a possible design, the first field is $1^{st}$ bit to an $m^{th}$ bit of the service field.

In a possible design, the second field is preconfigured.

In a possible design, the bit quantity of the initialization state of the scrambling code sequence is n, and the second field is an $(m+1)^{th}$ bit to an $n^{th}$ bit of the service field.

In a possible design, the second field is carried in the non-EHT PPDU.

In a possible design, the second field is carried in one or more of the following information of the non-EHT PPDU: a preamble, a media access control MAC frame, and a trigger frame.

In a possible design, the bit quantity of the initialization state of the scrambling code sequence is n, and the second field is n–m bits in m bits of the first field, where m≥n–m.

In a possible design, the bit quantity of the first field is 7.

In a possible design, the bit quantity of the initialization state of the scrambling code sequence is 11.

In a possible design, the processing module is further configured to determine the scrambling code sequence based on the initialization state of the scrambling code sequence, and perform scrambling processing based on the scrambling code sequence to generate the EHT PPDU. The transceiver module is further configured to send the EHT PPDU.

For an implementation of the receiving device in the second aspect, refer to a behavior function of the receiving device in the method for determining the initialization state of the scrambling code sequence provided in any one of the first aspect or the possible designs of the first aspect.

According to a third aspect, an embodiment of this application provides a receiving device. The receiving device may be a receiving device, or a chip or a system on chip in the receiving device. The receiving device may implement functions performed by the receiving device in the foregoing aspects or the possible designs, and the functions may be implemented by hardware. In a possible design, the receiving device may include a transceiver and a processor. The transceiver and the processor may be configured to support the receiving device in implementing the functions in any one of the first aspect or the possible designs of the first aspect. For example, the transceiver may be configured to receive, from a sending device, a non-EHT PPDU that includes a service field, where the service field includes a first field whose bit quantity is m, and m≥1. The processor may be configured to determine an initialization state of a scrambling code sequence corresponding to an EHT PPDU based on the first field, where a bit quantity of the initialization state of the scrambling code sequence is greater than the bit quantity of the first field. In another possible design, the receiving device may further include a memory, and the memory is configured to store computer-executable instructions and data for the receiving device. When the receiving device runs, the transceiver and the processor execute the computer-executable instructions stored in the memory, so that the receiving device performs the method for determining the initialization state of the scrambling code sequence according to any one of the first aspect or the possible designs of the first aspect.

For an implementation of the receiving device in the third aspect, refer to a behavior function of the receiving device in the method for determining the initialization state of the scrambling code sequence provided in any one of the first aspect or the possible designs of the first aspect.

According to a fourth aspect, an embodiment of this application provides a method for determining an initialization state of a scrambling code sequence. The method includes: A sending device sends a non-EHT PPDU that includes a service field to a receiving device, where the service field includes a first field whose bit quantity is m, and m≥1; and the sending device determines an initialization state of a scrambling code sequence corresponding to an EHT PPDU based on the first field, where a bit quantity of the initialization state of the scrambling code sequence is greater than the bit quantity of the first field.

Based on the fourth aspect, the sending device may also determine, based on the first field in the service field of the non-EHT PPDU, the initialization state of the scrambling code sequence corresponding to the EHT PPDU, so that the sending device and another device may use same bits as initialization states of scrambling code sequences when simultaneously sending EHT PPDUs at a same frequency, thereby ensuring that the scrambling code sequences corresponding to the EHT PPDUs sent by the plurality of devices are completely the same, reducing mutual interference between signals, and further enabling multi-AP channel detection and multi-AP joint transmission.

In a possible design, the sending device obtains a second field, and determines the initialization state of the scrambling code sequence corresponding to the EHT PPDU based on the first field and the second field, where a bit quantity of the second field is a difference between the bit quantity of the initialization state of the scrambling code sequence and the bit quantity of the first field.

Based on this possible design, the sending device may determine, based on the first field and the second field, the initialization state of the scrambling code sequence corresponding to the EHT PPDU. A feasible solution is provided for the sending device to determine the initialization state of the scrambling code sequence corresponding to the EHT PPDU.

In a possible design, the sending device determines the scrambling code sequence based on the initialization state of the scrambling code sequence, performs scrambling processing based on the scrambling code sequence to generate the EHT PPDU, and sends the EHT PPDU.

Based on this possible design, when the sending device and the another device simultaneously send the EHT PPDUs at the same frequency, the sending device and the another device may generate same scrambling code sequences by using same initialization states, to ensure that the plurality of devices simultaneously send same EHT PPDUs at the same frequency, thereby reducing interference between signals and improving communication reliability.

It should be noted that, for descriptions of the first field and the second field in this embodiment of this application, refer to the descriptions of the first field and the second field in the first aspect. Details are not described herein again.

According to a fifth aspect, an embodiment of this application provides a sending device. The sending device may implement a function performed by the sending device in the fourth aspect or the possible design of the fourth aspect, and the function may be implemented by executing corresponding software by hardware. The hardware or the software includes one or more modules corresponding to the functions, for example, a transceiver module and a processing module. The transceiver module is configured to send, to a receiving device, a non-EHT PPDU that includes a service field, where the service field includes a first field whose bit quantity is m, and m≥1. The processing module is configured to determine an initialization state of a scrambling code sequence corresponding to an EHT PPDU based on the first field, where a bit quantity of the initialization state of the scrambling code sequence is greater than the bit quantity of the first field.

In a possible design, the sending device obtains a second field, and determines the initialization state of the scrambling code sequence corresponding to the EHT PPDU based on the first field and the second field, where a bit quantity of the second field is a difference between the bit quantity of the initialization state of the scrambling code sequence and the bit quantity of the first field.

In a possible design, the sending device determines the scrambling code sequence based on the initialization state of the scrambling code sequence, performs scrambling processing based on the scrambling code sequence to generate the EHT PPDU, and sends the EHT PPDU.

For an implementation of the sending device in the fifth aspect, refer to a behavior function of the sending device in the method for determining the initialization state of the scrambling code sequence provided in any one of the fourth aspect or the possible designs of the fourth aspect.

It should be noted that, for descriptions of the first field and the second field in this embodiment of this application, refer to the descriptions of the first field and the second field in the first aspect. Details are not described herein again.

According to a sixth aspect, an embodiment of this application provides a sending device. The sending device may be a sending device, or a chip or a system on chip in the sending device. The sending device may implement functions performed by the sending device in the foregoing aspects or the possible designs, and the functions may be implemented by hardware. In a possible design, the sending device may include a transceiver and a processor. The transceiver and the processor may be configured to support the sending device in implementing the functions in any one of the fourth aspect or the possible designs of the fourth aspect. For example, the transceiver may be configured to send, to a receiving device, a non-EHT PPDU that includes a service field, where the service field includes a first field whose bit quantity is m, and m≥1. The processor may be configured to determine an initialization state of a scrambling code sequence corresponding to an EHT PPDU based on the first field, where a bit quantity of the initialization state of the scrambling code sequence is greater than the bit quantity of the first field. In still another possible design, the sending device may further include a memory, and the memory is configured to store computer-executable instructions and data for the sending device. When the sending device runs, the transceiver and the processor execute the computer-executable instructions stored in the memory, so that the sending device performs the method for determining the initialization state of the scrambling code sequence according to any one of the fourth aspect or the possible designs of the fourth aspect.

For an implementation of the sending device in the sixth aspect, refer to a behavior function of the sending device in the method for determining the initialization state of the scrambling code sequence provided in any one of the fourth aspect or the possible designs of the fourth aspect.

According to a seventh aspect, an embodiment of this application provides a method for determining an initialization state of a scrambling code sequence. The method includes: A sending device sends a non-EHT PPDU that includes a service field to a receiving device, where the service field includes a first field whose bit quantity is m, and m≥1; the sending device receives an EHT PPDU from the receiving device, where an initialization state of a scrambling code sequence corresponding to the EHT PPDU is determined based on the first field, and a bit quantity of the initialization state of the scrambling code sequence is greater than the bit quantity of the first field; and the sending device descrambles the EHT PPDU based on the initialization state of the scrambling code sequence corresponding to the EHT PPDU.

Based on the seventh aspect, the sending device may trigger, by sending the non-EHT PPDU, a plurality of receiving devices to use same bits as initialization states of scrambling code sequences when simultaneously sending EHT PPDUs at a same frequency, thereby ensuring that the scrambling code sequences corresponding to the EHT PPDUs sent by the plurality of receiving devices are completely the same, reducing mutual interference between signals, and further enabling multi-AP channel sounding and multi-AP joint transmission.

In a possible design, the initialization state of the scrambling code sequence is determined based on the first field and a second field, where a bit quantity of the second field is a difference between the bit quantity of the initialization state of the scrambling code sequence and the bit quantity of the first field.

It should be noted that, for descriptions of the first field and the second field in this embodiment of this application, refer to the descriptions of the first field and the second field in the first aspect. Details are not described herein again.

According to an eighth aspect, an embodiment of this application provides a sending device. The sending device may implement a function performed by the sending device in the seventh aspect or the possible design of the seventh aspect, and the function may be implemented by executing corresponding software by hardware. The hardware or the software includes one or more modules corresponding to the functions, for example, a transceiver module and a processing module. The transceiver module is configured to send a non-EHT PPDU that includes a service field to a receiving device, where the service field includes a first field whose bit quantity is m, and m≥1. The transceiver module is further configured to receive an EHT PPDU from the receiving device, where an initialization state of a scrambling code sequence corresponding to the EHT PPDU is determined based on the first field, and a bit quantity of the initialization state of the scrambling code sequence is greater than the bit quantity of the first field. The processing module is configured to descramble the EHT PPDU based on the initialization state of the scrambling code sequence corresponding to the EHT PPDU.

In a possible design, the initialization state of the scrambling code sequence is determined based on the first field and a second field, where a bit quantity of the second field is a difference between the bit quantity of the initialization state of the scrambling code sequence and the bit quantity of the first field.

For an implementation of the sending device in the eighth aspect, refer to a behavior function of the sending device in the method for determining the initialization state of the scrambling code sequence provided in any one of the seventh aspect or the possible designs of the seventh aspect.

It should be noted that, for descriptions of the first field and the second field in this embodiment of this application, refer to the descriptions of the first field and the second field in the first aspect. Details are not described herein again.

According to a ninth aspect, an embodiment of this application provides a sending device. The sending device may be a sending device, or a chip or a system on chip in the sending device. The sending device may implement functions performed by the sending device in the foregoing aspects or the possible designs, and the functions may be implemented by hardware. In a possible design, the sending device may include a transceiver and a processor. The transceiver and the processor may be configured to support the sending device in implementing the functions in any one of the seventh aspect or the possible designs of the seventh aspect. For example, the transceiver may be configured to send a non-EHT PPDU that includes a service field to a receiving device, where the service field includes a first field whose bit quantity is m, and m≥1. The transceiver may further be configured to receive an EHT PPDU from the receiving device, where an initialization state of a scrambling code sequence corresponding to the EHT PPDU is determined based on the first field, and a bit quantity of the initialization state of the scrambling code sequence is greater than the bit quantity of the first field. The processor may further be configured to descramble the EHT PPDU based on the initialization state of the scrambling code sequence corresponding to the EHT PPDU. In still another possible design, the sending device may further include a memory, and the memory is configured to store computer-executable instructions and data for the sending device. When the sending device runs, the transceiver and the processor execute the computer-executable instructions stored in the memory, so that the sending device performs the method for determining the initialization state of the scrambling code sequence according to any one of the seventh aspect or the possible designs of the seventh aspect.

For an implementation of the sending device in the ninth aspect, refer to a behavior function of the sending device in the method for determining the initialization state of the scrambling code sequence provided in any one of the seventh aspect or the possible designs of the seventh aspect.

According to a tenth aspect, a communication apparatus is provided. The communication apparatus includes one or more processors and one or more memories, the one or more memories are coupled to the one or more processors, the one or more memories are configured to store a computer program or instructions, and the one or more processors are configured to run the computer program or instructions. When the one or more processors execute the computer program or instructions, the method for determining the initialization state of the scrambling code sequence according to any one of the first aspect or the possible designs of the first aspect is performed, the method for determining the initialization state of the scrambling code sequence according to any one of the fourth aspect or the possible designs of the fourth aspect is performed, or the method for determining the initialization state of the scrambling code sequence according to any one of the seventh aspect or the possible designs of the seventh aspect is performed.

In a possible embodiment, the memory is located outside the communication apparatus. In another possible embodiment, the memory is located inside the communication apparatus. In this embodiment of this application, the processor and the memory may alternatively be integrated into one component. In other words, the processor and the memory may alternatively be integrated together.

In a possible design, the communication apparatus further includes one or more communication interfaces, the one or more communication interfaces are coupled to one or more processors, and the one or more communication interfaces are configured to communicate with a module other than the communication apparatus. One or more communication interfaces are coupled to one or more processors.

According to an eleventh aspect, a communication apparatus is provided. The communication apparatus includes an interface circuit and a logic circuit, and the interface circuit is coupled to the logic circuit. The logic circuit is configured to perform the method for determining the initialization state of the scrambling code sequence according to any one of the first aspect or the possible designs of the first aspect; perform the method for determining the initialization state of the scrambling code sequence according to any one of the fourth aspect or the possible designs of the fourth aspect; or perform the method for determining the initialization state of the scrambling code sequence according to any one of the seventh aspect or the possible designs of the seventh aspect. The interface circuit is configured to communicate with a module other than the communication apparatus.

According to a twelfth aspect, a computer-readable storage medium is provided. The computer-readable storage medium stores computer instructions or a program. When the computer instructions or the program are/is run on a computer, the computer performs the method for determining the initialization state of the scrambling code sequence according to any one of the first aspect or the possible designs of the first aspect, performs the method for determining the initialization state of the scrambling code sequence according to any one of the fourth aspect or the possible designs of the fourth aspect, or perform the method for determining the initialization state of the scrambling code sequence according to any one of the seventh aspect or the possible designs of the seventh aspect.

According to a thirteenth aspect, a computer program product including computer instructions is provided. When the computer program product runs on a computer, the method for determining the initialization state of the scrambling code sequence according to any one of the first aspect or the possible designs of the first aspect is performed, the method for determining the initialization state of the scrambling code sequence according to any one of the fourth aspect or the possible designs of the fourth aspect is performed, or the method for determining the initialization state of the scrambling code sequence according to any one of the seventh aspect or the possible designs of the seventh aspect is performed.

According to a fourteenth aspect, an embodiment of this application provides a computer program. When the computer program is run on a computer, the method for determining the initialization state of the scrambling code sequence according to any one of the first aspect or the possible designs of the first aspect is performed, the method for determining the initialization state of the scrambling code sequence according to any one of the fourth aspect or the possible designs of the fourth aspect is performed, or the method for determining the initialization state of the scrambling code sequence according to any one of the seventh aspect or the possible designs of the seventh aspect is performed.

For a technical effect brought by any design manner of the tenth aspect to the fourteenth aspect, refer to a technical effect brought by any possible design of the first aspect, refer to a technical effect brought by any possible design of the fourth aspect, or refer to a technical effect brought by any possible design of the seventh aspect. Details are not described again.

According to a fifteenth aspect, a communication system is provided. The communication system includes the receiving device according to any one of the second aspect and the third aspect and the sending device according to any one of the fifth aspect and the sixth aspect, or includes the receiving device according to any one of the second aspect and the third aspect and the sending device according to any one of the eighth aspect and the ninth aspect.

BRIEF DESCRIPTION OF DRAWINGS

FIG. 7 is a diagram of a scrambler according to an embodiment of this application;

FIG. 8 is a diagram of a communication system according to an embodiment of this application;

DESCRIPTION OF EMBODIMENTS

Figure 1:
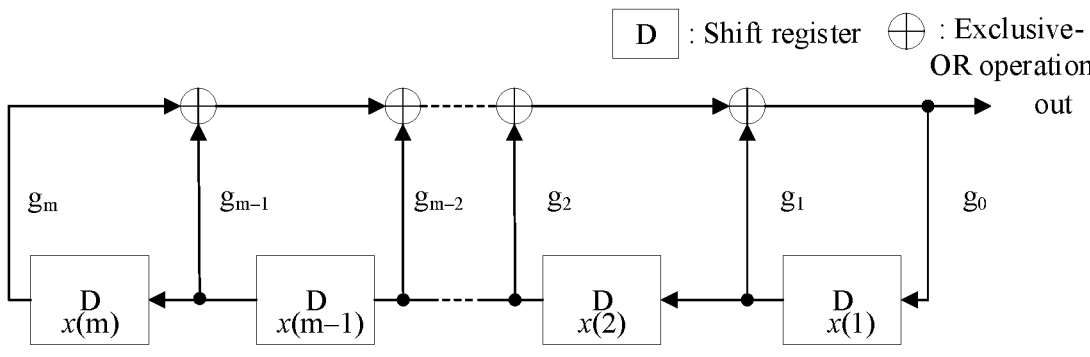
FIG. 1 is a diagram of a scrambler according to an embodiment of this application.

Before embodiments of this application are described, technical terms in embodiments of this application are described.

A physical layer protocol data unit (PPDU) is a carrier sent by a physical layer, and may also be described as a data packet or a data packet.

A media access control (MAC) frame is a carrier sent at a MAC layer, may be carried in a data field of a PPDU, and may include a control frame, a management frame, a data frame, and the like.

A WLAN communication system starts from the 802.11a/b/g standard, and has undergone a plurality of generations of standards, such as the 802.11n standard, the 802.11ac standard, the 802.11ax standard, and the 802.11be standard. Standards before the 802.11be standard, such as the 802.11a/b/g standard, the 802.11n standard, the 802.11ac standard, and the 802.11ax standard, may also be collectively referred to as a non-802.11be standard.

Standards before the HT standard, such as the 802.11a/b/g, may be collectively referred to as a non-high throughput (non-HT) standard. The 802.11n standard may also be referred to as a high throughput (HT) standard. The 802.11ac standard may also be referred to as a very high throughput (VHT) standard. The 802.11ax standard may be referred to as a high efficiency (HE) standard, and may also be referred to as a sixth generation wireless fidelity (Wi-Fi 6) standard. The 802.11be standard may be referred to as an extremely high throughput (EHT) standard, and may also be referred to as a Wi-Fi 7 standard.

In the WLAN communication system, communication apparatuses may communicate with each other by using a PPDU. For a PPDU corresponding to each standard, when the PPDU is described, a prefix of the standard may be placed before the PPDU.

For example, a PPDU corresponding to a standard (such as the 802.11a/b/g standard) before the 802.11n standard may be referred to as a non-HT PPDU, a PPDU corresponding to the 802.11n standard may be referred to as an HT PPDU, a PPDU corresponding to the 802.11ac standard may be referred to as a VHT PPDU, a PPDU corresponding to the 802.11ax standard may be referred to as an HE PPDU, and a PPDU corresponding to the 802.11be standard may be referred to as an EHT PPDU.

In the communication system, for example, a first communication apparatus sends a PPDU to a second communication apparatus. To facilitate extraction of a clock signal from a line signal, consecutive "0"s and consecutive "1"s need to be avoided. Therefore, the first communication apparatus may perform an exclusive-OR operation on a to-be-sent original information bit stream (consisting of 0 and 1, or may be described as data) and another pseudo-random sequence, and encode an exclusive-OR result to generate a PPDU for sending. After receiving the PPDU, the second communication apparatus may decode the PPDU, and perform an exclusive-OR operation on a decoded bit stream and a same pseudo-random sequence (that is, a pseudo-random sequence that is the same as the pseudo-random sequence used by the first communication apparatus), to restore the original information bit stream.

The exclusive-OR operation performed by the first communication apparatus on the original information bit stream and the pseudo-random sequence may be referred to as scrambling, and the pseudo-random sequence may also be described as a scrambling code sequence. The operation of restoring, by the second communication apparatus, the original information bit stream from a scrambled sequence may be referred to as descrambling. The first communication apparatus may encrypt the original information bit stream by performing the exclusive-OR operation on the original information bit stream and the pseudo random sequence, thereby improving communication reliability.

In addition, an orthogonal frequency division multiplexing (orthogonal frequency division multiplexing, OFDM) symbol is formed by superimposing a plurality of independently modulated subcarrier signals. When phases of the subcarriers are the same or similar, the superimposed signals are modulated by a same initial phase signal, resulting in a large instantaneous power peak and a high peak-to-average power ratio (PAPR). Because a dynamic range of a common power amplifier is limited, a signal with a large peak-to-average power ratio is very likely to enter a non-linear area of the power amplifier, and consequently, non-linear distortion occurs in the signal, obvious spectrum extension interference and in-band signal distortion are caused, and performance of the entire communication system is severely degraded. The high PAPR has become a major technical obstacle to the OFDM. The foregoing scrambling code technology can be used to reduce the PAPR of the OFDM communication system.

For example, each communication apparatus may generate a scrambling code sequence by using a scrambler, to scramble an original information bit stream, or restore an original information bit stream from a scrambled sequence.

For example, as shown in FIG. 1, the scrambler may include a plurality of cyclic shift registers, where $g_i$ (i=0, 1, m) is a weighting coefficient, and a value of the weighting coefficient may be 1 or 0; $g_0$ and $g_m$ may generally be fixed to 1; m is an order of a cyclic shift register, and a higher order indicates a longer non-repeated sequence that can be generated; and x(m) is a value of an $m^{th}$ cyclic shift register, and the value may be 1 or 0.

For example, the communication apparatus generates the scrambling code sequence by using the scrambler shown in FIG. 1. A generation method of the scrambling code sequence may include the following operations.

Operation 101: The communication apparatus initializes values x(1), x(2), . . . , and x(m) of m cyclic shift registers.

The initial values of the m cyclic shift registers may also be described as an initialization state of the scrambling code sequence.

Operation 102: The communication apparatus calculates an output bit according to the following formula:

$$out = \text{mod}\left(\sum_{i=1}^{m} g_i x(i), 2\right)$$

out is the output bit, and mod(*,2) is a modulo operation performed on 2.

Operation 103: The communication apparatus updates the values of the m cyclic shift registers in the following manner:

$$x(m)=x(m-1), x(m-1)=x(m-2), \ldots, x(2)=x(1), x(1)= out.$$

Operation 104: The communication apparatus cyclically repeats the foregoing operations, and aggregates the generated output bits to form the scrambling code sequence.

After the update process in operation 103 is repeated for a predetermined quantity of times, the output bit repeats the previous output bit, and a length of a longest non-repeated sequence that can be generated by the scrambler is not greater than $2^m-1$.

It should be noted that the scrambler may also be represented by using a generator polynomial.

For example, the scrambler in FIG. 1 may be described by using the following generator polynomial:

$$G(X) = \sum_{i=0}^{m} g_i X^i.$$

G(X) represents the scrambler; $g_i$(i=0, 1, . . . , m) is a weighting coefficient, and a value of the weighting coefficient may be 1 or 0; $g_0$ and $g_m$ may generally be fixed to 1; and X represents a cyclic shift register.

Figure 2:
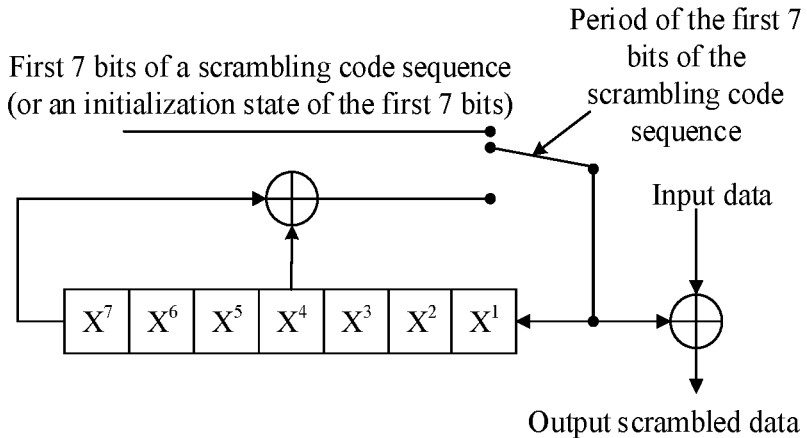
FIG. 2 is a diagram of a scrambler according to an embodiment of this application.

In the WLAN communication system, as shown in FIG. 2, from the 802.11a/b/g standard to the 802.11ax standard, the communication apparatus may generate a scrambling code sequence by using a scrambler shown in FIG. 2. In the 802.11be standard, the communication apparatus may generate a scrambling sequence by using a scrambler shown in FIG. 4.

As shown in FIG. 2, an order of the scrambler may be 7, that is, the scrambler may include seven cyclic shift registers, and a polynomial corresponding to the scrambler may be $S(X)=X^7+X^4+1$, where S(X) represents the scrambler, or may be described as the foregoing G(X). The scrambler may generate a longest non-repeated scrambling code sequence (scrambling sequence) whose length is 127. When the length of the longest non-repeated scrambling code sequence is 127, the scrambling code sequence may also be described as a periodic sequence whose period is 127.

For example, a first communication apparatus needs to send a PPDU to a second communication apparatus. As shown in FIG. 2, the first communication apparatus may initialize each cyclic shift register of the scrambler by using a 7-bit initialization state with reference to the foregoing operation 101 to operation 104, and generate a scrambling code sequence; then perform an exclusive-OR operation on the generated scrambling code sequence and input data, to obtain scrambled data (or may be described as a scrambled sequence); and encode the scrambled data to generate a PPDU for sending.

It should be noted that the scrambling code sequence whose period is 127 may be generated by the scrambler shown in FIG. 2, but a start location (or may be described as a phase of the scrambler) of the scrambling code sequence needs to be determined by an initialization state of each cyclic shift register in the scrambler. In addition, the second communication apparatus also needs to know an initialization state (initial state) of the scrambler, to generate a scrambling code sequence that is the same as that of the first communication apparatus, to restore original data.

To enable the second communication apparatus to know the initialization state of the scrambler, from the 802.11a/b/g standard to the 802.11ax standard, a 16-bit service field is defined at the beginning of a data field of the PPDU, and data may follow the service field.

Figure 3:
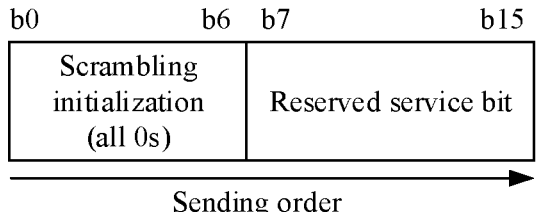
FIG. 3 is a diagram of a frame structure of a service field according to an embodiment of this application.

For example, as shown in FIG. 3, the service field may include a 7-bit scrambling initialization field and a 9-bit reserved service bit field. For a service field before scrambling, a scrambling initialization field of the service field is all 0s.

In some embodiments, the first communication apparatus may initialize the initialization state (initial state) of the scrambler by using a 7-bit non-all-0 value, set the first 7 bits of the service field to 0, and input the service field and the original data together into the scrambler shown in FIG. 2 for scrambling. Because any number obtained by performing an exclusive-OR operation on the any number and 0 is equal to the any number itself (1 XOR 0=1, 0 XOR 0=0, XOR represents an exclusive OR), the first 7 bits output by the scrambler record the initialization state of the scrambler. The second communication apparatus may determine the initialization state of the scrambler based on the first 7 bits of a scrambled service field, so that a scrambling code sequence that is the same as the scrambling code sequence used by the first communication apparatus can be generated at the second communication apparatus, and descramble the scrambled data, to obtain the original data.

The use of the scrambler may make the sent PPDU more random, to avoid occurrence of consecutive "0"s and consecutive "1"s. In addition, the use of the scrambler also has a function of encrypting the original data, thereby avoid plaintext transmission and improving communication reliability. In addition, because of randomness of the scrambled data, it may be avoided that same information or a periodic signal is transmitted on subcarriers of one OFDM symbol in the OFDM system, thereby reducing the PAPR of the OFDM system.

Based on the foregoing scrambler whose initialization state is 7 bits from the 802.11a/b/g standard to the 802.11ax standard, to further prevent occurrence of the periodic signal and reduce the PAPR of the OFDM system, a scrambler of a higher order is further introduced in the 802.11be standard.

Figure 4:
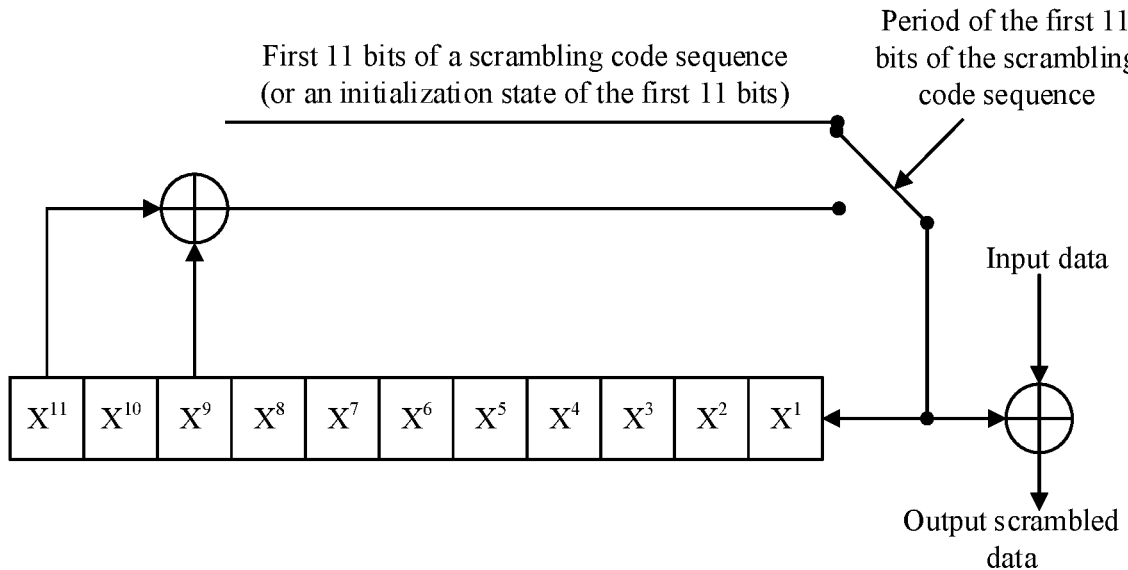
FIG. 4 is a diagram of a scrambler according to an embodiment of this application.

For example, as shown in FIG. 4, an order of the scrambler may be 11, that is, the scrambler may include 11 cyclic shift registers, and a polynomial corresponding to the scrambler may be $S(X)=X^{11}+X^9+1$, where S(X) represents the scrambler, or may be described as the foregoing G(X). The scrambler may generate a longest non-repeated scrambling code sequence (scrambling sequence) whose length is 2047. When the length of the longest non-repeated scrambling code sequence is 2047, the scrambling code sequence may also be described as a periodic sequence whose period is 2047.

Figure 5:
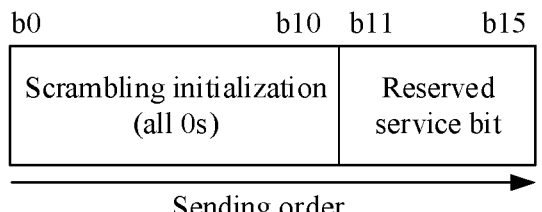
FIG. 5 is a diagram of a frame structure of a service field according to an embodiment of this application.

Correspondingly, the 802.11be standard also adjusts the service field to some extent. As shown in FIG. 5, the service field may include an 11-bit scrambling initialization field and a 5-bit reserved service bit field. For a service field before scrambling, a scrambling initialization field of the service field may be all 0s.

For example, an initialization state of the scrambler is an 11-bit all "1" sequence. The communication apparatus may use the scrambler shown in FIG. 4 to generate the following scrambling code sequence whose period is 2047 bits:

1111111111100000000011000000111100001100 11000
111111110110000001011100000
1001011001011001111001111100111100011110 01101
1001111101111100001010001101000101 1100
101001011100011001011011111001101000011 1110010
1100011100111011011110101101001000110
0110101111110001000001101010001110000101 101
1001001101111011111010010010010 01100011
0111110111010001010100101000001100010001 1110
10101100100000111101000110010010 11111
0110010001011110101001001000011011010011 1011
001101011111010001000100101010101100
0000011100000011011000011101110011010101 1111
000001000110001010111010000100010010
0101101101100110110111111101101000010110 010010
011110110110110010110101110011000101111
1101001000010011010010111100110010011111 111011
100000101011000100001110101001101000
0111100100110011011011111101010000001000 0100010
100101010001100000101111000100100110
1011011110001101001101110011110101111001 00010
0111010101110100000101001001000100 01101
010101110000000101100000100111000101 11011010
010101100110000111111100110000011 1111
0001100001101111001110100111101001110010 01110
11101110101010100000000000000010000000
1010000001000100001010101001000000011010 00000
1110010001101110101110101010001010000 1
0100010010001010110101000011000010011110 0101

11001110010111101110010010010111011000
01010111001000010111010010010100110110001111
0        11101100101010111100000100110000101
11110010010001110110101101010001100011101111
01101010010110000110011100111111101111
00001010011001000111111101011000010001110010
01101110000110101100111000111111011011
00010110111010011010100111100001110011001101
11111111010000000010010000010110100010
01100101011111100001000011001010011111000111
00011011011011101101101010110110000011
01110001110101101101000110110010110111100101
01001110000111011000110101011101110001
01010110100000011001000011111010011000100111
10101110001000101101010100110000011
11100001100011001111011111100101000011100010
11011010111011000100101110101100010
00111100010110011010011111100111000011101100
11001011111111001000000111010000110100
0100111001101110111110101010001000001010100
00100000100101000101100010100011101000
1110100101101001100100.

The first 11 bits may be bits of the initialization state of the scrambling code sequence. The communication apparatus may perform an exclusive-OR operation on original data and the foregoing scrambling code sequence in a period of 2047 bits, to complete a scrambling operation, or perform an exclusive-OR operation on scrambled data and the foregoing scrambling code sequence in a period of 2047 bits, to complete a descrambling operation.

It can be learned from the foregoing that initialization states of scrambling code sequences corresponding to from the 802.11a/b/g standard to the 802.11ax standard (or may be described as a non-802.11be standard) are all 7 bits, and an initialization state of a scrambling code sequence corresponding to the 802.11be standard is 11 bits. When a plurality of communication apparatuses receive PPDUs (which may be a PPDU corresponding to any one of the 802.11a/b/g standard to the 802.11be standard), and when non-EHT PPDUs (which may be a PPDU corresponding to any one of the 802.11a/b/g standard to the 802.11ax standard) need to be simultaneously sent at a same frequency based on the received PPDUs, to ensure communication reliability, scrambling code sequences corresponding to the non-EHT PPDUs sent by the plurality of communication apparatuses need to be completely the same. That is, when the plurality of communication apparatuses simultaneously send the non-EHT PPDUs at the same frequency, initialization states of the used scrambling code sequences need to be completely the same. Based on this, the communication apparatus may use the first 7 bits of the initialization state of the scrambling code sequence corresponding to the received PPDU as the initialization state of the scrambling code sequence used when the non-EHT PPDU is sent.

Figure 6:
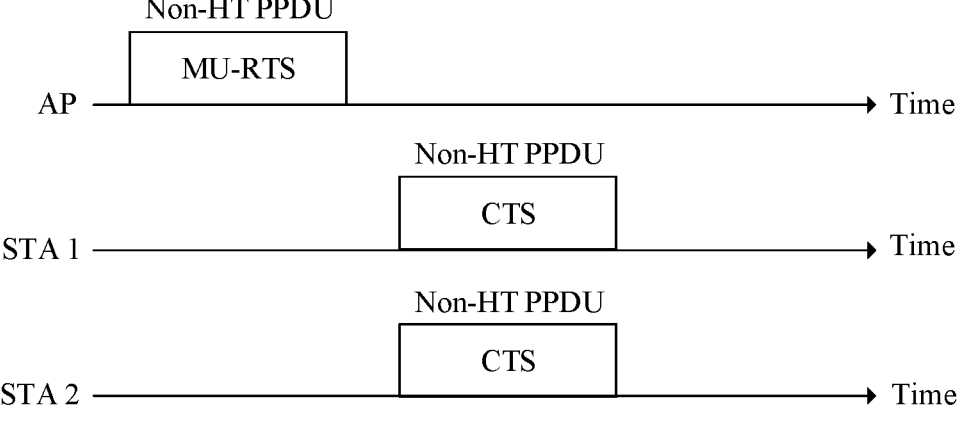
FIG. 6 is a diagram of a signal time sequence according to an embodiment of this application.

For example, as shown in FIG. 6, an access point (AP) sends, to a station (STA) 1 and a STA 2, non-HT PPDUs that carry multi-user request to send (MU-RTS) frames, and triggers the STA 1 and the STA 2 to simultaneously send, at a same frequency, non-HT PPDUs that carry clear to send (CTS) frames. To avoid mutual interference between the non-HT PPDUs sent by the STA 1 and the STA 2, scrambling code sequences corresponding to the non-HT PPDUs that carry the CTS frames and that are sent by the STA 1 and the STA 2 need to be completely the same, to ensure that the STA 1 and the STA 2 may not interfere with each other when simultaneously sending the non-HT PPDUs at the same frequency, thereby improving communication reliability.

When it is ensured that content of data fields sent by the STA 1 and the STA 2 is the same, it needs to be ensured that scrambling code sequences used by the STA 1 and the STA 2 are completely the same, that is, it needs to be ensured that initialization states of the scrambling code sequences used by the STA 1 and the STA 2 are the same.

Based on this, after receiving the non-HT PPDUs that carry the MU-RTS frames, the STA 1 and the STA 2 may read the first 7 bits of service fields before descrambling (or may be described as a service field scrambled by the AP), to obtain initialization states of scrambling code sequences corresponding to the non-HT PPDUs that carry the MU-RTS frames, and use initialization states of the scrambling code sequences corresponding to the non-HT PPDUs that carry the CTS frames and that are sent by the STA 1 and the STA 2, to generate the scrambling code sequences. Therefore, it is ensured that the initialization states of the scrambling code sequences corresponding to the non-HT PPDUs that carry the CTS frames and that are sent by the STA 1 and the STA 2 are the same, and it is further ensured that the non-HT PPDUs sent by the STA 1 and the STA 2 are the same, thereby reducing signal interference and improving communication reliability.

In addition, similar to that the AP carries the MU-RTS frames to the non-HT PPDUs and sends the non-HT PPDUs to the STA 1 and the STA 2, the AP may also carry the MU-RTS frames to HT PPDUs, VHT PPDUs, or HE PPDUs and send the HT PPDUs, the VHT PPDUs, or the HE PPDUs to the STA 1 and the STA 2. The SAT 1 and the STA 2 may use initialization states of scrambling code sequences corresponding to the received HT PPDUs, VHT PPDUs, or HE PPDUs as the initialization states of the scrambling code sequences corresponding to the non-HT PPDUs that carry the CTS frames and that are sent by the STA 1 and the STA 2.

In another example, as shown in FIG. 7, an AP sends EHT PPDUs that carry MU-RTS frames to a station STA 1 and a STA 2 and triggers the STA 1 and the STA 2 to simultaneously send non-HT PPDUs that carry CTS frames at a same frequency. Because an initialization state of a scrambling code sequence corresponding to the EHT PPDU is 11 bits, and an initialization state of a scrambling code sequence corresponding to the non-HT PPDU is 7 bits, after receiving the EHT PPDUs that carry the MU-RTS frames, the STA 1 and the STA 2 may read the first 7 bits of service fields before descrambling (or may be described as a service field scrambled by the AP); use the first 7 bits as the initialization states of the scrambling code sequences corresponding to the non-HT PPDUs that carry the CTS frames and that are sent by the STA 1 and the STA 2, to generate the scrambling code sequences based on the scrambler; perform exclusive-OR operations on the generated scrambling code sequences and input data to obtain scrambled data; and encode the scrambled data to generate the non-HT PPDUs for sending. Therefore, it is ensured that the initialization states of the scrambling code sequences corresponding to the non-HT PPDUs that carry the CTS frames and that are sent by the STA 1 and the STA 2 are the same, and it is further ensured that the non-HT PPDUs sent by the STA 1 and the STA 2 are the same, thereby reducing signal interference and improving communication reliability.

It should be noted that, in FIG. 7, for an EHT PPDU to be sent on an AP side, the first 11 bits of a service field are all 0s before scrambling, and are in an 11-bit initialization state after scrambling. For an EHT PPDU received on a STA side, the first 11 bits of a service field are in an 11-bit initialization state before descrambling, and the 11 bits are all 0s after a scrambling code sequence is generated based on the initialization state and descrambling is performed by using the scrambling code sequence.

It can be learned from the foregoing that, when a plurality of communication apparatuses receive non-EHT PPDUs or EHT PPDUs, and need to simultaneously send the non-EHT PPDUs based on received PPDUs at a same frequency, the plurality of communication apparatuses may use the first 7 bits of scrambling code sequences corresponding to the received PPDUs as initialization states of scrambling code sequences used when the non-EHT PPDUs are sent, to ensure that initialization states of scrambling code sequences corresponding to the non-HT PPDUs sent by the plurality of communication apparatuses are the same, to further ensure that non-HT PPDUs sent by the plurality of communication apparatuses are the same, thereby reducing interference between signals and improving communication reliability.

However, when a plurality of communication apparatuses receive non-EHT PPDUs, and need to simultaneously send EHT PPDUs based on the received non-EHT PPDUs at a same frequency, how the plurality of communication apparatuses determine, based on the non-EHT PPDUs, initialization states of scrambling code sequences corresponding to the EHT PPDUs becomes an urgent problem to be resolved.

To resolve this problem, embodiments of this application provide a method for determining an initialization state of a scrambling code sequence and an apparatus. A receiving device may receive a non-EHT PPDU that includes a service field and that is sent by a sending device. The service field may include a first field whose bit quantity is m, where $m \geq 1$. The receiving device may determine an initialization state of a scrambling code sequence corresponding to an EHT PPDU based on the first field, where a bit quantity of the initialization state of the scrambling code sequence is n, and $n > m$.

In embodiments of this application, all a plurality of receiving devices may determine, based on first fields in service fields of received non-EHT PPDUs, initialization states of scrambling code sequences corresponding to EHT PPDUs, so that the plurality of receiving devices may use same bits as the initialization states of the scrambling code sequences when sending the EHT PPDUs, thereby ensuring that the scrambling code sequences corresponding to the EHT PPDUs sent by the plurality of receiving devices are completely the same, reducing mutual interference between signals, and further enabling multi-AP channel detection and multi-AP joint transmission.

The following describes embodiments of this application in detail with reference to accompanying drawings in this disclosure.

The method for determining the initialization state of the scrambling code sequence provided in this embodiment of this application may be applied to any WLAN communication system, for example, may be a WLAN system using the 802.11be standard, or may be a WLAN communication system using a future Wi-Fi standard. This is not limited. The future Wi-Fi standard may be a standard such as the 802.11bx standard or the 802.11cx standard. This is not limited. The WLAN communication system may also be a WLAN system using the 802.11a/b/g standard, a WLAN system using the 802.11n standard, a WLAN system using the 802.11ac standard, or a WLAN system using the 802.11ax standard.

It should be noted that the 802.11bx standard may also be described as a Wi-Fi 8 standard, and the 802.11cx standard may also be described as a Wi-Fi 9 standard. A PPDU corresponding to a standard after the 802.11be standard may be referred to as an evolved extremely high throughput PPDU (evolved extremely high throughput, EHT+PPDU). For example, a PPDU corresponding to the 802.11bx standard may be referred to as an EHT+PPDU, or a PPDU corresponding to the 802.11cx standard may be referred to as an EHT+PPDU.

In addition, the WLAN communication system provided in this embodiment of this application may alternatively be a communication system such as a cellular system, a Bluetooth system, or an ultra-wideband (UWB) system that uses the foregoing Wi-Fi standard. This is not limited.

The following uses FIG. 8 as an example to describe a WLAN communication system provided in an embodiment of this application.

FIG. 8 is a schematic diagram of a communication system according to an embodiment of this application. As shown in FIG. 8, the communication system may include an access point device and a station device. One or more access point devices may communicate with one or more station devices, the access point device may also communicate with one or more other access point devices, and the station device may also communicate with one or more other station devices.

The access point device may be an access point AP, and the station device may be an STA.

For example, the AP may be a device that supports a plurality of WLAN standards such as the 802.11be standard or a future Wi-Fi standard (such as the 802.11bx standard or the 802.11cx standard), or may be a device that supports the 802.11a/b/g standard, the 802.11n standard, the 802.11ac standard, or the 802.11ax standard. This is not limited.

For example, the AP may be a terminal device, a network device, a communication server, a router, a switch, a bridge, a computer, or the like that has a Wi-Fi chip. The AP may also be an access point for a mobile user to enter a wired network, and is mainly deployed in a home, inside a building and inside a campus. A typical coverage radius is dozens of meters to hundreds of meters. Certainly, the AP may also be deployed outdoors. The AP is equivalent to a bridge connecting a wired network and a wireless network, and is mainly used to connect wireless network clients together, and then connect the wireless network to the Ethernet.

For example, the STA may be a device that supports a plurality of WLAN standards such as the 802.11be standard or a future Wi-Fi standard (such as the 802.11bx standard or the 802.11cx standard), or may be a device that supports the 802.11a/b/g standard, the 802.11n standard, the 802.11ac standard, or the 802.11ax standard. This is not limited.

For example, the STA may be a wireless communication chip, a wireless sensor, a wireless communication terminal, a communication server, a router, a switch, a bridge, a computer, or the like. For example, the STA may be a mobile phone, a tablet computer, a set-top box, a smart television, an intelligent wearable device, an in-vehicle communication device, a computer, or the like that supports a Wi-Fi communication function. This is not limited.

Figures 9, 10:
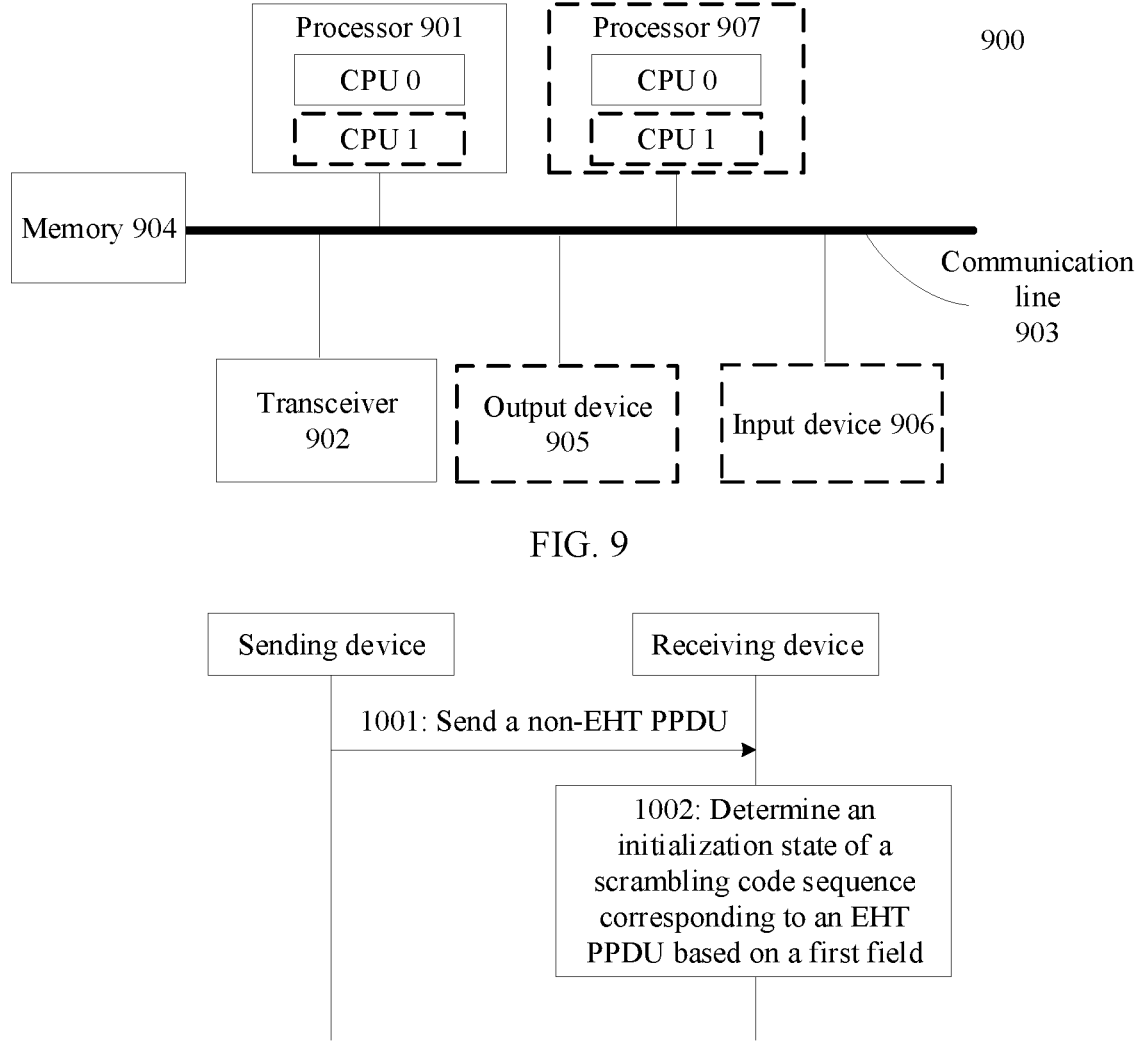
FIG. 9 is a diagram of a communication apparatus according to an embodiment of this application.
FIG. 10 is a flowchart of a method for determining an initialization state of a scrambling code sequence according to an embodiment of this application.

In some embodiments, as shown in FIG. 8, for example, each access point device and each station device may use a composition structure shown in FIG. 9, or include components shown in FIG. 9. FIG. 9 is a schematic composition diagram of a communication apparatus 900 according to an embodiment of this application. The communication apparatus 900 may be an access point device, or a chip or a system on chip in the access point device; or may be a station device, or a chip or a system on chip in the station device. As shown in FIG. 9, the communication apparatus 900 includes a processor 901, a transceiver 902, and a communication line 903.

Further, the communication apparatus 900 may further include a memory 904. The processor 901, the memory 904, and the transceiver 902 may be connected through the communication line 903.

The processor 901 is a central processing unit (CPU), a general-purpose processor, a network processor (NP), a digital signal processor (DSP), a microprocessor, a microcontroller, a programmable logic device (PLD), or any combination thereof. Alternatively, the processor 901 may be another apparatus having a processing function, for example, a circuit, a component, or a software module. This is not limited.

The transceiver 902 is configured to communicate with another device or another communication network. The another communication network may be an Ethernet, a radio access network (RAN), a WLAN, or the like. The transceiver 902 may be a module, a circuit, a transceiver, or any apparatus that can implement communication.

The communication line 903 is used to transmit information between components included in the communication apparatus 900.

The memory 904 is configured to store instructions. The instruction may be a computer program.

The memory 904 may be a read-only memory (ROM) or another type of static storage device that can store static information and/or instructions, or may be a random access memory (RAM) or another type of dynamic storage device that can store information and/or instructions, or may be an electrically erasable programmable read-only memory (EE-PROM), a compact disc read-only memory (CD-ROM) or another compact disc storage, optical disc storage (including a compressed optical disc, a laser disc, an optical disc, a digital universal optical disc, a Blu-ray optical disc, and the like), magnetic disk storage medium or another magnetic storage device, or the like. This is not limited.

It should be noted that the memory 904 may exist independently of the processor 901, or may be integrated with the processor 901. The memory 904 may be configured to store instructions, program code, some data, or the like. The memory 904 may be located in the communication apparatus 900, or may be located outside the communication apparatus 900. This is not limited. The processor 901 is configured to execute the instructions stored in the memory 904, to implement the method for determining the initialization state of the scrambling code sequence provided in the following embodiments of this application.

In an example, the processor 901 may include one or more CPUs, for example, a CPU 0 and a CPU 1 in FIG. 9.

In an embodiment, the communication apparatus 900 includes a plurality of processors. For example, in addition to the processor 901 in FIG. 9, the communication apparatus 200 may further include a processor 907.

In an embodiment, the communication apparatus 900 further includes an output device 905 and an input device 906. For example, the input device 906 is a device such as a keyboard, a mouse, a microphone, or a joystick, and the output device 905 is a device such as a display or a speaker.

It should be noted that the communication apparatus 900 may be a desktop computer, a portable computer, a network server, a mobile phone, a tablet computer, a wireless terminal, an embedded device, a chip system, or a device having a similar structure in FIG. 9. In addition, the composition structure shown in FIG. 9 does not constitute a limitation on the communication apparatus. In addition to the components shown in FIG. 9, the communication apparatus may include more or fewer components than those shown in the figure, or combine some components, or have different component arrangements.

In this embodiment of this application, the chip system may include a chip, or may include a chip and another discrete component.

In addition, actions, terms, and the like in embodiments of this application may be mutually referenced. This is not limited. In embodiments of this application, names of messages exchanged between devices, names of parameters in the messages, or the like are merely examples. Other names may alternatively be used in some embodiments. This is not limited.

With reference to the communication system shown in FIG. 8, the following describes a method for determining an initialization state of a scrambling code sequence provided in an embodiment of this application with reference to FIG. 10. A sending device may be any access point device or station device in the communication system shown in FIG. 8, and a receiving device may be any access point device or station device in the communication system shown in FIG. 8. Both the sending device and the receiving device in the following embodiment may have the components shown in FIG. 2.

FIG. 10 is a flowchart of a method for determining an initialization state of a scrambling code sequence according to an embodiment of this application. As shown in FIG. 10, the method may include the following operations.

Operation 1001: A sending device sends a non-EHT PPDU to a receiving device.

The non-EHT PPDU may include a service field. The service field may include a first field. A bit quantity of the first field may be m, and $m \geq 1$.

For example, the non-EHT PPDU may be a general term of a non-HT PPDU, an HT PPDU, a VHT PPDU, and an HE PPDU, or the non-EHT PPDU may be described as any one of a non-HT PPDU, an HT PPDU, a VHT PPDU, and an HE PPDU. This is not limited.

In some embodiments, the sending device may generate a scrambling code sequence based on a 7-bit initialization state by using the scrambler shown in FIG. 2, perform an exclusive-OR operation on the scrambling code sequence and original data to obtain scrambled data, encode the scrambled data to generate the non-EHT PPDU, and send the non-EHT PPDU to the receiving device.

When the service field is described from a $1^{st}$ bit, the first field may be the $1^{st}$ bit to an $m^{th}$ bit of the service field of the non-EHT PPDU before descrambling by the receiving device; or when the service field is described from a $0^{th}$ bit, the first field may be described as the $0^{th}$ bit to an $(m-1)^{th}$ bit of the service field of the non-EHT PPDU before descrambling by the receiving device. Alternatively, the first field may also be described as the first m bits of the service field of the non-EHT PPDU before descrambling by the receiving device. This is not limited.

For example, m may be 7, that is, the first field may be the first 7 bits of the service field of the non-EHT PPDU before descrambling by the receiving device.

It should be noted that the first 7 bits of the service field of the non-EHT PPDU before descrambling by the receiving device are an initialization state of a scrambling code sequence corresponding to the non-EHT PPDU. When m is 7, the first field may also be described as an initialization state of a scrambling code sequence corresponding to the non-EHT PPDU before descrambling by the receiving device.

It should be noted that the non-EHT PPDU before descrambling by the receiving device is described for the receiving device. For the sending device, the non-EHT PPDU before descrambling by the receiving device may also be described as a non-EHT PPDU scrambled by the sending device.

Operation 1002: The receiving device determines an initialization state of a scrambling code sequence corresponding to an EHT PPDU based on the first field.

A bit quantity of the initialization state of the scrambling code sequence corresponding to the EHT PPDU may be greater than a bit quantity of the first field.

For example, the bit quantity of the initialization state of the scrambling code sequence corresponding to the EHT PPDU may be n, where n>m.

It should be noted that, in this embodiment of this application, the initialization state of the scrambling code sequence corresponding to the EHT PPDU is a non-all-0 sequence having n bits.

For example, the bit quantity of the initialization state of the scrambling code sequence corresponding to the EHT PPDU may be 11.

In some embodiments, the receiving device determines, based on the first field and a second field, an initialization state of the scrambling code sequence corresponding to the EHT PPDU.

A bit quantity of the second field may be a difference between the bit quantity of the initialization state of the scrambling code sequence corresponding to the EHT PPDU and the bit quantity of the first field. For example, when the bit quantity of the initialization state of the scrambling code sequence corresponding to the EHT PPDU is n, and the bit quantity of the first field is m, the bit quantity of the second field is n−m.

For example, the receiving device may obtain the second field by using any one of the following method 1 to method 4:

Method 1: The second field may be preconfigured.

The second field may be pre-specified in a communication protocol, or may be pre-negotiated by the sending device and the receiving device. This is not limited.

For example, the first field is 7 bits, and the initialization state of the scrambling code sequence corresponding to the EHT PPDU is 11 bits. The second field may be 4 bits pre-specified in a communication protocol, or may be 4 bits pre-negotiated by the sending device and the receiving device.

For example, the second field may be 4 bits that are all "1"s, may be 4 bits that are all "0"s, or may be 4 bits that are freely combined by "1"s and "0"s. This is not limited.

Figure 11:
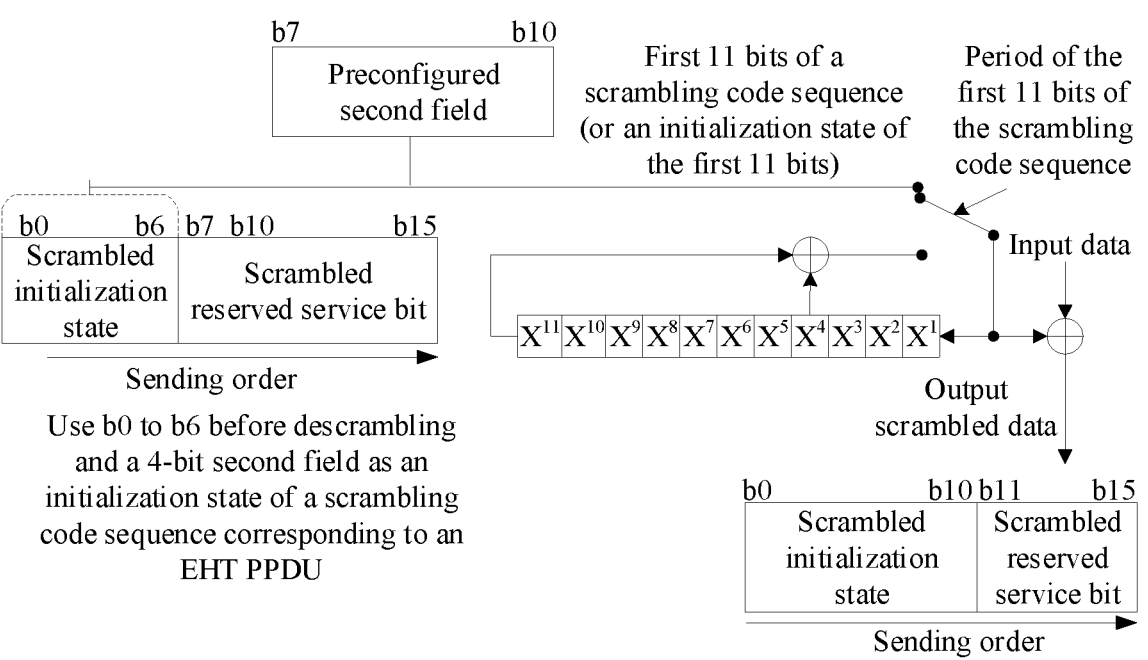
FIG. 11 is a diagram of a scrambler according to an embodiment of this application.

For example, the first field is 7 bits, and the initialization state of the scrambling code sequence corresponding to the EHT PPDU is 11 bits. As shown in FIG. 11, the receiving device may determine the initialization state of the scrambling code sequence corresponding to the EHT PPDU based on the first 7 bits of the service field of the non-EHT PPDU before descrambling by the receiving device and the pre-configured 4 bits of the second field, and perform scrambling processing based on an 11-bit initialization state, to generate the EHT PPDU. A service field of the EHT PPDU may include an 11-bit initialization state scrambled by the receiving device and a 5-bit reserved service bit scrambled by the receiving device.

Method 2: The second field may be an $(m+1)^{th}$ bit to an $n^{th}$ bit of the service field.

When the service field is described from a $1^{st}$ bit, the second field may be the $(m+1)^{th}$ bit to the $n^{th}$ bit of the service field of the non-EHT PPDU before descrambling by the receiving device; or when the service field is described from a $0^{th}$ bit, the second field may be described as an $m^{th}$ bit to an $(n−1)^{th}$ bit of the service field of the non-EHT PPDU before descrambling by the receiving device. Alternatively, with reference to the foregoing description of FIG. 3, the second field may also be described as the first n−m bits of reserved service bits scrambled by the sending device in the service field of the non-EHT PPDU before descrambling by the receiving device. This is not limited.

Figure 12:
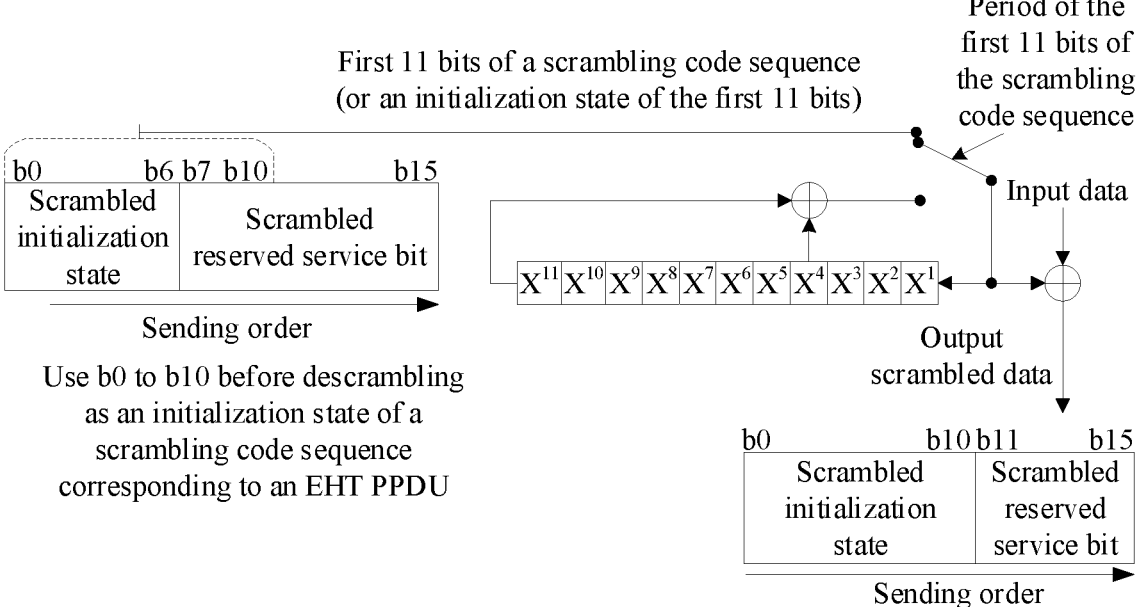
FIG. 12 is a diagram of a scrambler according to an embodiment of this application.

For example, the first field is 7 bits, and the initialization state of the scrambling code sequence corresponding to the EHT PPDU is 11 bits. As shown in FIG. 12, the receiving device may directly determine the first 11 bits of the service field of the non-EHT PPDU before descrambling by the receiving device as the initialization state of the scrambling code sequence corresponding to the EHT PPDU, and perform scrambling processing based on an 11-bit initialization state to generate the EHT PPDU. A service field scrambled by the receiving device of the EHT PPDU may include an 11-bit initialization state scrambled by the receiving device and a 5-bit reserved service bit scrambled by the receiving device.

Method 3: The second field may be carried in the non-EHT PPDU.

The second field may be carried in one or more of the following information of the non-EHT PPDU: a preamble field, a media access control MAC frame, and a trigger frame.

The second field may be determined by the sending device, and is carried in the non-EHT PPDU and sent to the receiving device.

For example, the first field is 7 bits, and the initialization state of the scrambling code sequence corresponding to the EHT PPDU is 11 bits. The second field may be 4 bits determined by the sending device itself.

For example, the second field may be 4 bits that are all "1"s, may be 4 bits that are all "0"s, or may be 4 bits that are freely combined by "1"s and "0"s. This is not limited.

For example, the sending device may add the second field to a frame header of the MAC frame and send the MAC frame to the receiving device.

Figure 13A:
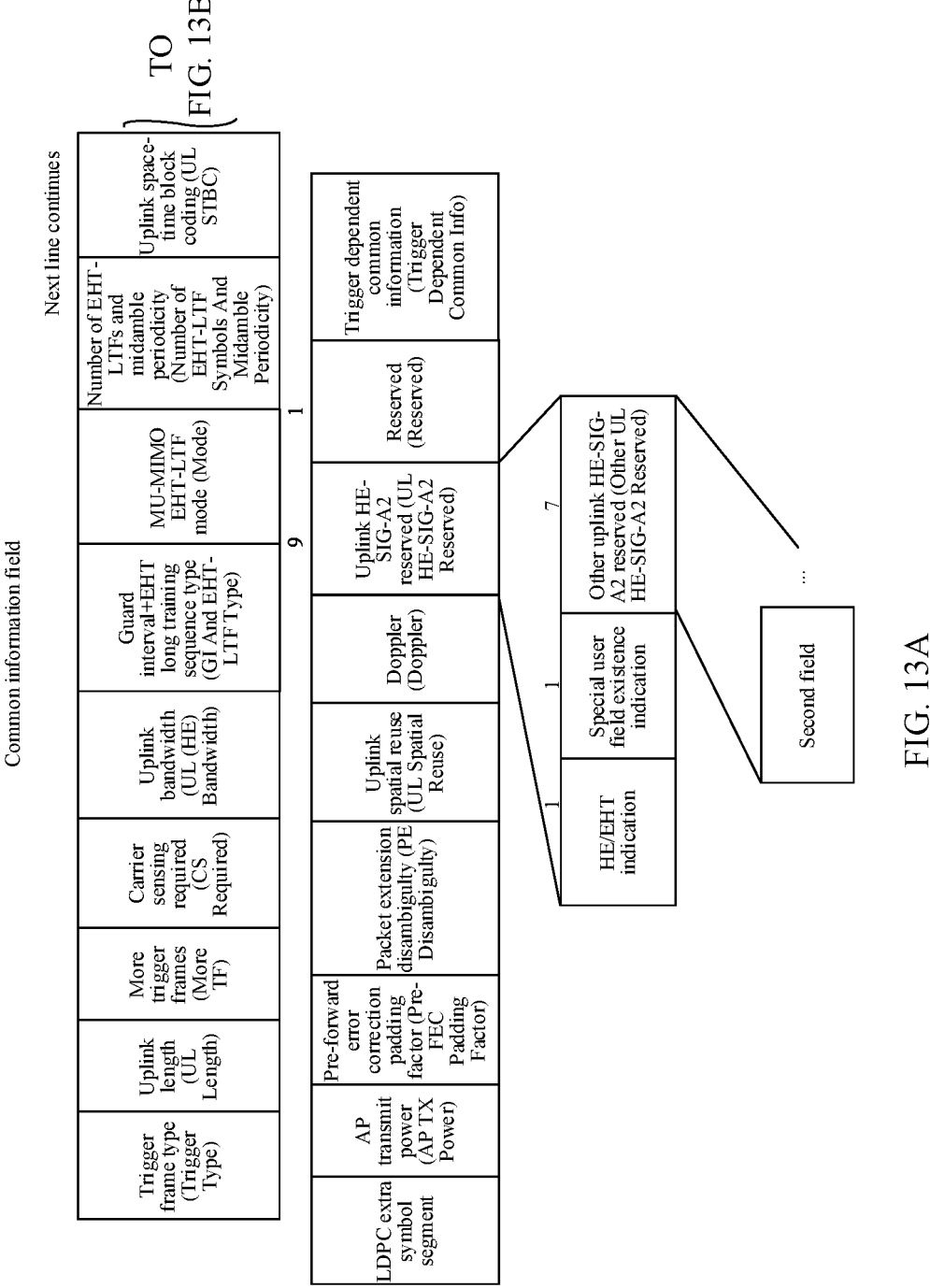
FIG. 13A and FIG. 13B are a diagram of a frame structure of a trigger frame according to an embodiment of this application.
Figure 13B:
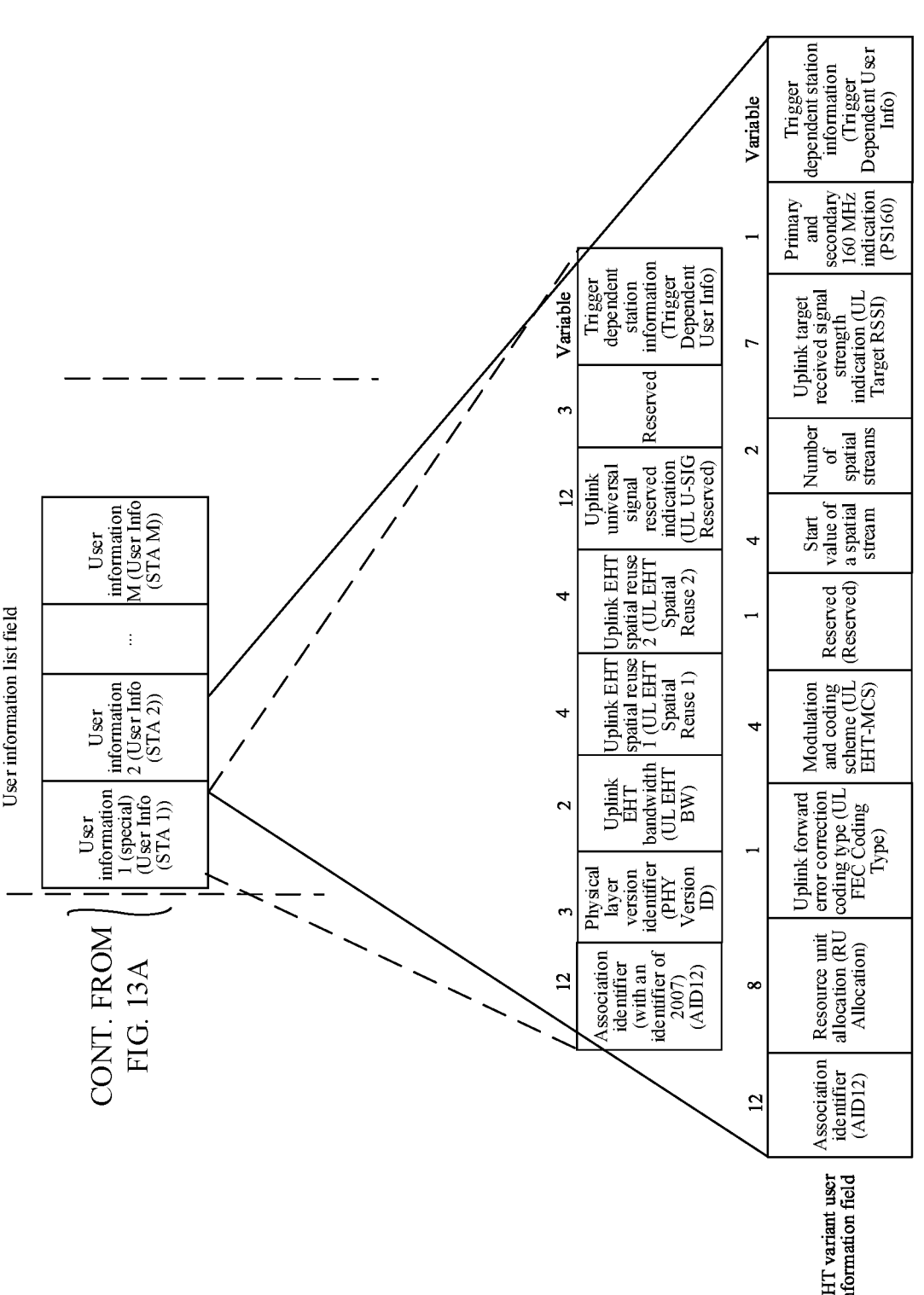

In still another example, as shown in FIG. 13A and FIG. 13B, the sending device may also carry the second field to the trigger frame, for example, some or all bits of an uplink HE-SIG-A2 reserved field, a reserved field, and a trigger dependent common information field that are in a common information field; and an uplink universal signal reserved indication field, a reserved field, and a trigger dependent station information field that are carried in a special user field. This is not limited. That the second field is carried in the reserved bit may also be described as follows: The second field is located in some or all of the following bits: b54 to b62 (that is, the uplink HE-SIG-A2 reserved field), b63 (that is, a reserved bit of the reserved field) that are in the common information field; and b25 to b36 (that is, all bits of the uplink U-SIG reserved indication field) and b37 to b39 (that is, reserved bits of the reserved field) that are in the special user field.

Figure 14:
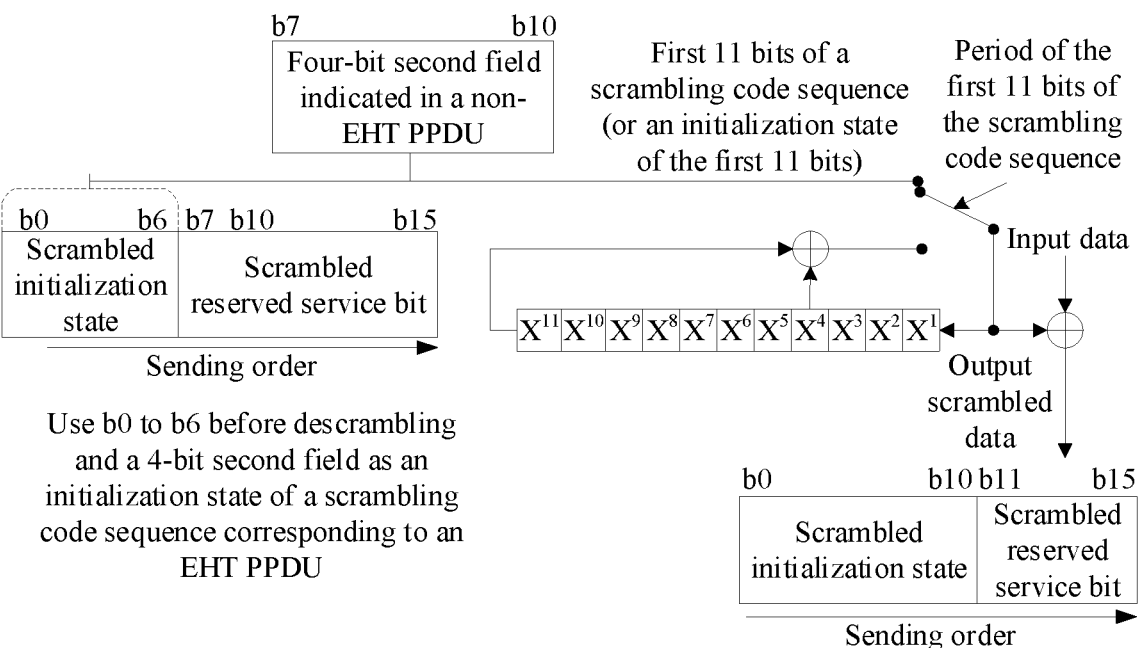
FIG. 14 is a diagram of a scrambler according to an embodiment of this application.

For example, the first field is 7 bits, and the initialization state of the scrambling code sequence corresponding to the EHT PPDU is 11 bits. As shown in FIG. 14, the receiving device may determine the initialization state of the scrambling code sequence corresponding to the EHT PPDU based on the first 7 bits of the service field of the non-EHT PPDU before descrambling by the receiving device and a second bit carried in the non-EHT PPDU before descrambling by the receiving device, and perform scrambling processing based on an 11-bit initialization state to generate the EHT PPDU. A service field scrambled by the receiving device of the EHT PPDU may include an 11-bit initialization state scrambled by the receiving device and a 5-bit reserved service bit scrambled by the receiving device.

Method 4: The second field is n−m bits in the m bits of the first field, where m≥n−m.

Alternatively, the receiving device may determine the second field based on the first field, that is, determine n−m bits in the m bits of the first field as the second field.

For example, the receiving device may determine the first n−m bits in the m bits of the first field as the second field, may determine the last n−m bits in the m bits of the first field as the second field, or may determine the middle n−m bits in the m bits of the first field as the second field. This is not limited.

Figure 15:
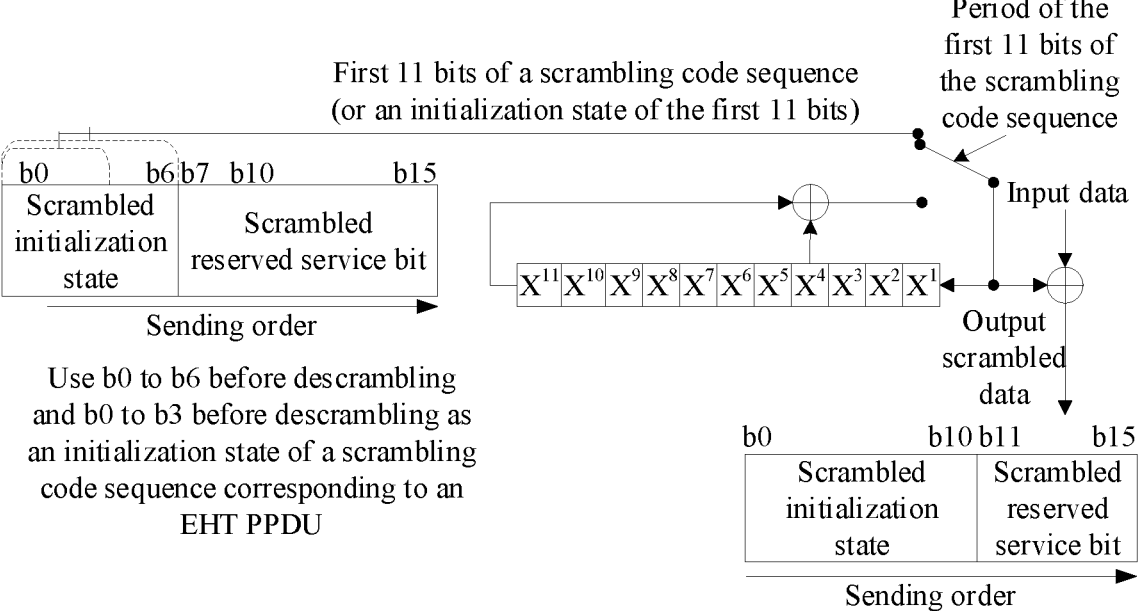
FIG. 15 is a diagram of a scrambler according to an embodiment of this application.

For example, the first field is 7 bits, and the initialization state of the scrambling code sequence corresponding to the EHT PPDU is 11 bits. As shown in FIG. 15, the receiving device may determine the first 4 bits in the 7 bits of the first field as the second field.

In addition, the receiving device may alternatively cyclically determine the n−m bits of the second field based on x bits in the m bits of the first field, where $1 \leq x \leq m$.

For example, the first field is 7 bits, and the initialization state of the scrambling code sequence corresponding to the EHT PPDU is 11 bits. The receiving device may cyclically obtain the second field by using the first two bits of the first field, that is, the first two bits of the second field are the first two bits of the first field, and the last two bits of the second field are the first two bits of the first field.

For another example, for example, the first field is 7 bits, and the initialization state of the scrambling code sequence corresponding to the EHT PPDU is 11 bits. The receiving device may cyclically obtain the second field by using the first three bits of the first field, that is, the first three bits of the second field are the first three bits of the first field, and the last one bit of the second field is the first one bit of the first field.

After obtaining the second field according to any one of the foregoing method 1 to method 4, the receiving device may determine, based on the first field and the second field, the initialization state of the scrambling code sequence corresponding to the EHT PPDU.

For example, the second field may be located at a high bit in the initialization state, and the first field may be located at a low bit in the initialization state; or the first field may be located at a high bit in the initialization state, and the second field may be located at a low bit in the initialization state.

For example, the first field is 7 bits, and the second field is 4 bits. Assuming that the initialization state is described from a $1^{st}$ bit, the second field may be located at the $1^{st}$ bit to a $4^{th}$ bit in the initialization state, and the first field may be located at a $5^{th}$ bit to an $11^{th}$ bit in the initialization state. Assuming that the initialization state is described from a $0^{th}$ bit, the second field may be located at the $0^{th}$ bit to a $3^{rd}$ bit in the initialization state, and the first field may be located at the $4^{th}$ bit to a $10^{th}$ bit in the initialization state.

For another example, the first field is 7 bits, and the second field is 4 bits. Assuming that the initialization state is described from a $1^{st}$ bit, the first field may be located at the $1^{st}$ to a $7^{th}$ bit in the initialization state, and the second field may be located at an $8^{th}$ bit to an $11^{th}$ bit in the initialization state. Assuming that the initialization state is described from a $0^{th}$ bit, the first field may be located at the $0^{th}$ bit to a $6^{th}$ bit in the initialization state, and the second field may be located at the $7^{th}$ bit to a $10^{th}$ bit in the initialization state.

In still another example, a plurality of bits of the second field may be inserted into one or more predetermined locations of the first field, to form the initialization state.

The predetermined location may be pre-specified in a communication protocol, or may be pre-negotiated by the sending device and the receiving device. This is not limited.

For example, the first field is 7 bits, and the second field is 4 bits. Assuming that the initialization state is described from a $1^{st}$ bit, the first x bits of the first field may be located at the $1^{st}$ bit to an $x^{th}$ bit in the initialization state, the 4 bits of the second field may be located at an $(x+1)^{th}$ bit to an $(x+4)^{th}$ bit in the initialization state, and the last 7−x bits of the first field may be located at an $(x+5)^{th}$ bit to an $11^{th}$ bit in the initialization state. Assuming that the initialization state is described from a $0^{th}$ bit, the first x bits of the first field may be located at the $0^{th}$ bit to an $(x-1)^{th}$ bit in the initialization state, the 4 bits of the second field may be located at the $x^{th}$ bit to an $(x+3)^{th}$ bit in the initialization state, and the last 7−x bits of the first field may be located at the $(x+4)^{th}$ bit to a $10^{th}$ bit in the initialization state. x<7.

For another example, the first field is 7 bits, and the second field is 4 bits. Assuming that the initialization state is described from a $1^{st}$ bit, the first y bits of the second field may be located at the $1^{st}$ bit to a $y^{th}$ bit in the initialization state, the 7 bits of the first field may be located at a 67±0th bit to a $(y+7)^{th}$ bit in the initialization state, and the last 4−y bits of the second field may be located at a $(y+8)^{th}$ bit to an $11^{th}$ bit in the initialization state. Assuming that the initialization state is described from a $0^{th}$ bit, the first y bits of the second field may be located at the $0^{th}$ bit to a $(y-1)^{th}$ bit in the initialization state, the 7 bits of the first field may be located at the $y^{th}$ bit to a $(y+6)^{th}$ bit in the initialization state, and the last 4−y bits of the second field may be located at the $(y+7)^{th}$ bit to a $10^{th}$ bit in the initialization state. y<4.

For still another example, the first field is 7 bits, and the second field is 4 bits. Assuming that the initialization state is described from a $1^{st}$ bit, the first x bits of the first field may be located at the $1^{st}$ bit to an $x^{th}$ bit in the initialization state, they bits of the second field may be located at an $(x+1)^{th}$ bit to an $(x+y)^{th}$ bit in the initialization state, the last 7−x bits of the first field may be located at an $(x+y+1)^{th}$ bit to a $(7+y)^{th}$ bit in the initialization state, and the last 4−y bits of the second field may be located at a $(7+y+1)^{th}$ bit to an $11^{th}$ bit in the initialization state. Assuming that the initialization state is described from a $0^{th}$ bit, the first x bits of the first field may be located at the $0^{th}$ bit to an $(x-1)^{th}$ bit in the initialization state, they bits of the second field may be located at the $x^{th}$ bit to an $(x+y-1)^{th}$ bit in the initialization state, the last 7−x bits of the first field may be located at the $(x+y)^{th}$ bit to a $(7+y-1)^{th}$ bit in the initialization state, and the last 4−y bits of the second field may be located at the $(7+y)^{th}$ bit to a $10^{th}$ bit in the initialization state. x<7 and y<4.

For yet another example, the first field is 7 bits, and the second field is 4 bits. Assuming that the initialization state is described from a $1^{st}$ bit, the first y bits of the second field may be located at the $1^{st}$ bit to a $y^{th}$ bit in the initialization state, the x bits of the first field may be located at a $(y+1)^{th}$ bit to an $(x+y)^{th}$ bit in the initialization state, the last 4−y bits of the second field may be located at an $(x+y+1)^{th}$ bit to a $(4+x)^{th}$ bit in the initialization state, and the last 7−x bits of the first field may be located at a $(4+x+1)^{th}$ bit to an $11^{th}$ bit in the initialization state. Assuming that the initialization state is described from a $0^{th}$ bit, the first y bits of the second field may be located at the $0^{th}$ bit to a $(y-1)^{th}$ bit in the initialization state, the x bits of the first field may be located at the $y^{th}$ bit to an $(x+y-1)^{th}$ bit in the initialization state, the last $4-y$ bits of the second field may be located at the $(x+y)^{th}$ bit to a $(4+x-1)^{th}$ bit in the initialization state, and the last $7-x$ bits of the first field may be located at the $(4+x)^{th}$ bit to a $10^{th}$ bit in the initialization state. $x<7$ and $y<4$.

It should be noted that the method provided in this embodiment of this application is also applicable to a PPDU corresponding to a future Wi-Fi standard, for example, an EHT+PPDU.

In an example, the sending device triggers, by sending non-EHT PPDUs, a plurality of receiving devices to simultaneously send EHT+PPDUs at a same frequency. Assuming that an initialization state of a scrambling code sequence corresponding to the EHT+PPDU is $n_1$ bits, the receiving device may determine, with reference to the foregoing descriptions of the first field and the second field, an initialization state of a scrambling code sequence corresponding to the EHT+PPDU, where a bit quantity of the first field is m, and a bit quantity of the second field is $n_1-m$, where $n_1>m$. $n_1$ may be equal to n, or may not be equal to n.

In another example, for example, the sending device triggers, by sending EHT PPDUs, a plurality of receiving devices to simultaneously send EHT+PPDUs at a same frequency. Assuming that an initialization state of a scrambling code sequence corresponding to the EHT+PPDU is $n_1$ bits $(n_1>n)$, the EHT PPDU received by the receiving device may include a service field, the service field may include a first field, and a bit quantity of the first field may be $m_1$. The receiving device may determine, with reference to the foregoing description of the second field, an initialization state of a scrambling code sequence corresponding to the EHT+ PPDU based on the first field and the second field. The first field may be the first $m_1$ bits of a service field of the EHT PPDU before descrambling by the receiving device, $m_1<n_1$, $m_1$ may be equal to m or may not be equal to m, and a bit quantity of the second field is $n_1-m_1$.

For example, $n_1=15$ and $m_1=11$. The bit quantity of the second field may be 4. The receiving device may determine an 11-bit first field based on the service field of the EHT PPDU before descrambling by the receiving device, obtain the second field with reference to the foregoing description of the second field, and determine, based on the first field and the second field, an initialization state of a scrambling code sequence corresponding to an EHT+PPDU whose bit quantity is 15.

It should be noted that, when the bit quantity of the first field is the same as the bit quantity of the initialization state of the scrambling code sequence corresponding to the EHT PPDU, the initialization state of the scrambling code sequence corresponding to the EHT PPDU may be considered as the first field.

In still another example, the sending device, by sending EHT PPDUs, triggers a plurality of receiving devices to simultaneously send EHT+PPDUs at a same frequency. Assuming that an initialization state of a scrambling code sequence corresponding to the EHT+PPDU is $n_1$ bits $(n_1=n)$, the EHT PPDU received by the receiving device may include a service field, the service field may include a first field, and a bit quantity of the first field may be $m_1$. $m_1$ may be equal to n, and the receiving device may determine that the first field is the initialization state of the scrambling code sequence corresponding to the EHT+PPDU. That is, when the bit quantity of the initialization state of the scrambling code sequence corresponding to the EHT+PPDU is the same as the bit quantity of the initialization state of the scrambling code sequence corresponding to the EHT PPDU, the receiving device may use the initialization state of the scrambling code sequence corresponding to the EHT PPDU as the initialization state of the scrambling code sequence corresponding to the EHT+PPDU.

Based on the method shown in FIG. 10, all the plurality of receiving devices may determine, based on first fields in service fields of received non-EHT PPDUs, initialization states of scrambling code sequences corresponding to EHT PPDUs, so that the plurality of receiving devices may use same bits as the initialization states of the scrambling code sequences when sending the EHT PPDUs, thereby ensuring that the scrambling code sequences corresponding to the EHT PPDUs sent by the plurality of receiving devices are completely the same, reducing mutual interference between signals, and further enabling multi-AP channel detection and multi-AP joint transmission.

Figure 16:
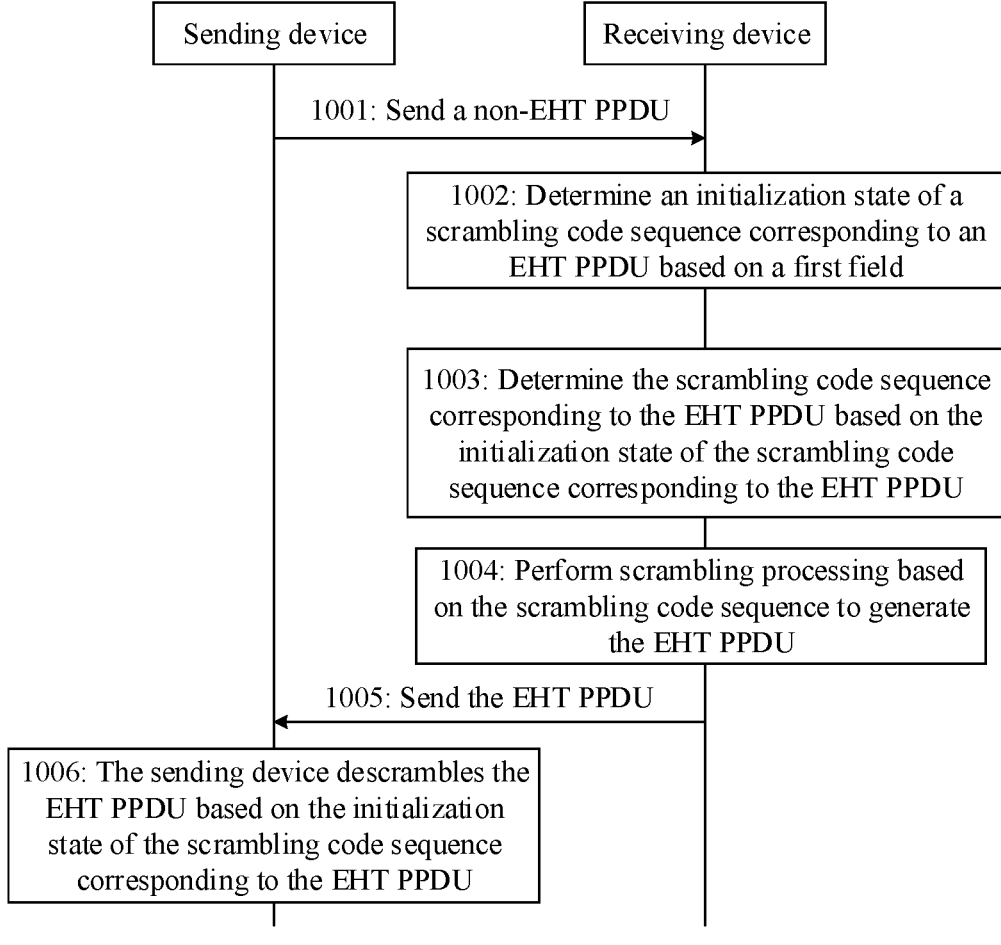
FIG. 16 is a flowchart of a method for determining an initialization state of a scrambling code sequence according to an embodiment of this application.

Further, as shown in FIG. 16, after the receiving device determines the initialization state of the scrambling code sequence corresponding to the EHT PPDU, the method shown in FIG. 10 may further include the following operation 1003 to operation 1006.

Operation 1003: The receiving device determines the scrambling code sequence corresponding to the EHT PPDU based on the initialization state of the scrambling code sequence corresponding to the EHT PPDU.

The receiving device may generate a scrambling code sequence based on an n-bit initialization state of the scrambler with reference to the method shown in operation 101 to operation 104. Details are not described again.

Operation 1004: The receiving device performs scrambling processing based on the scrambling code sequence to generate the EHT PPDU.

The receiving device may perform an exclusive-OR operation on the scrambling code sequence and original data to obtain scrambled data, and encode the scrambled data to generate the EHT PPDU.

Operation 1005: The receiving device sends the EHT PPDU to the sending device.

Operation 1006: The sending device descrambles the EHT PPDU based on the initialization state of the scrambling code sequence corresponding to the EHT PPDU.

The sending device may determine the initialization state of the scrambling code sequence corresponding to the EHT PPDU based on a service field in the EHT PPDU sent by the receiving device, generate a scrambling code sequence, and descramble the EHT PPDU based on the scrambling code sequence.

Based on the methods shown in FIG. 10 to FIG. 16, the sending device may send the non-EHT PPDU to each of the plurality of receiving devices, to trigger each of the plurality of receiving devices to determine, according to the methods shown in FIG. 10 to FIG. 16, the initialization state of the scrambling code sequence corresponding to the EHT PPDU, generate the scrambling code sequence based on the initialization state, further generate the EHT PPDU, and send the EHT PPDU to the sending device.

Correspondingly, similar to that the receiving device determines, based on the non-EHT PPDU sent by the sending device, the initialization state of the scrambling code sequence corresponding to the EHT PPDU, the sending device may also determine the initialization state of the scrambling code sequence corresponding to the EHT PPDU based on the non-EHT PPDU sent by the sending device, generate the scrambling code sequence based on the initialization state, and further generate the EHT PPDU for sending. Details are not described herein.

Similarly, for the PPDU corresponding to the future Wi-Fi standard, for example, the EHT+PPDU, the sending device may alternatively determine the initialization state of the scrambling code sequence corresponding to the EHT+PPDU with reference to the foregoing related description that the receiving device determines, based on the received PPDU, the initialization state of the scrambling code sequence corresponding to the EHT+PPDU, generate the scrambling code sequence based on the initialization state, and further generate the EHT+PPDU for sending. Details are not described herein again.

Figure 17:
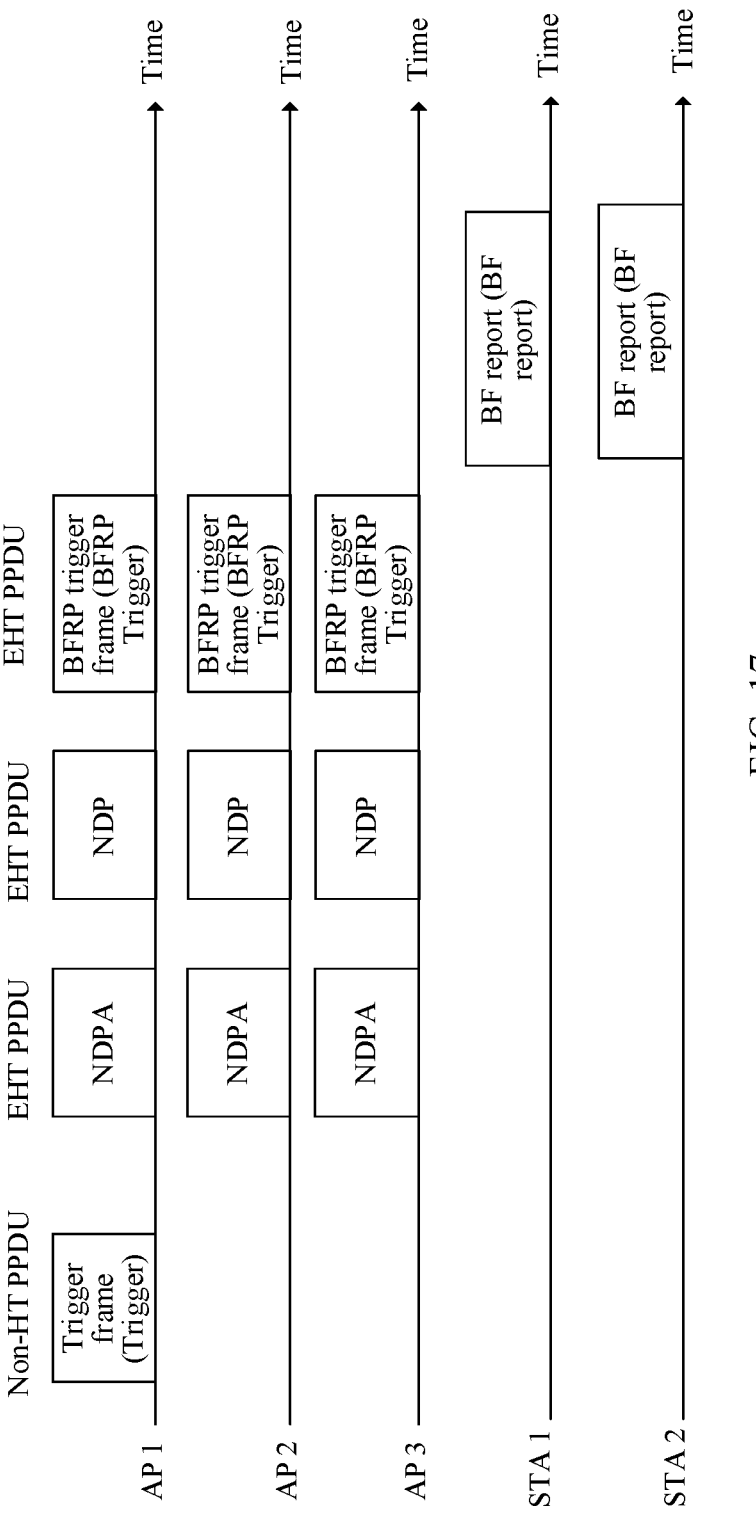
FIG. 17 is a diagram of a signal time sequence according to an embodiment of this application.

In an example, a plurality of APs jointly perform channel sounding. As shown in FIG. 17, an AP 1 may carry a trigger frame in a non-EHT PPDU (for example, a non-HT PPDU) for sending. Because a MAC frame carried in the non-HT PPDU may be demodulated by all devices, to obtain a duration field of a MAC frame header, so that an AP or a STA that does not participate in transmission remains silent based on the duration field, and the AP 1 obtains a transmit opportunity (TXOP). This helps ensure that an entire transmission process is not interfered by a third-party AP or STA. The trigger frame may be used to trigger a plurality of APs (which may include an AP 1, an AP 2, and an AP 3) to simultaneously send null data packet notification (NDPA) frames at a same frequency, to notify one or more destination STAs of participating in channel sounding. Then, the plurality of APs send NDPs (the NDP does not include a PPDU of a data field, and is not a MAC frame), and the plurality of APs send beamforming report poll trigger (BFRP trigger) frames, to trigger a plurality of STAs to feed back beamforming reports (BF report).

The AP 1, the AP 2, and the AP 3 may carry the NDPAs, the NDPs, and/or the BFRP trigger frames to EHT PPDUs, and simultaneously send the NDPAs, the NDPs, and/or the BFRP trigger frames at a same frequency. Simultaneous transmission of the plurality of APs at the same frequency helps STAs at different locations receive frames sent by the plurality of APs.

Figure 18:
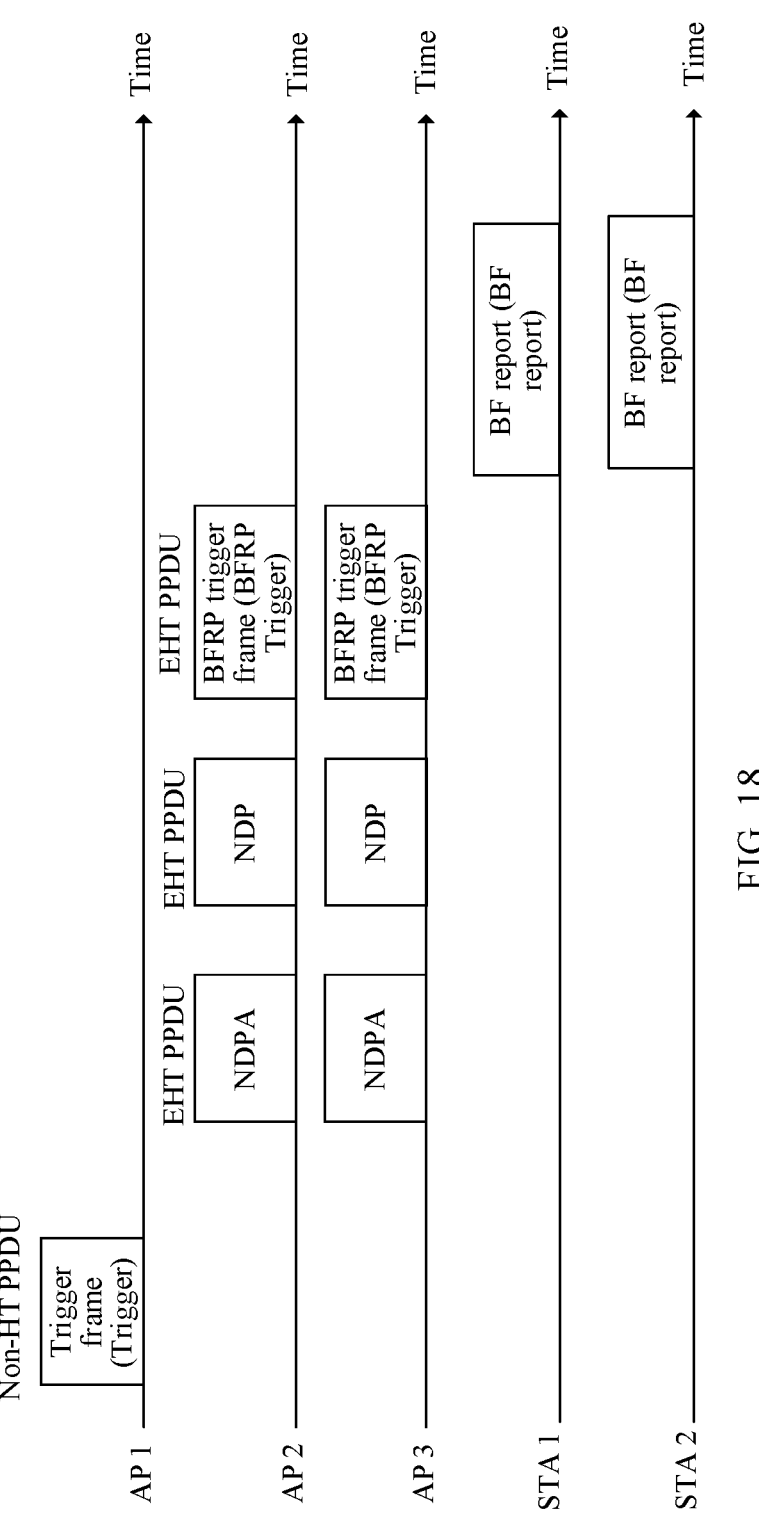
FIG. 18 is a diagram of a signal time sequence according to an embodiment of this application.

In another example, a plurality of APs jointly perform channel sounding. As shown in FIG. 18, an AP 1 may also carry a trigger frame in a non-EHT PPDU (for example, a non-HT PPDU) for sending, to trigger a plurality of APs (which may include an AP 2 and an AP 3) to simultaneously send NDPA frames at a same frequency and to notify one or more destination STAs of participating in channel sounding. Then, the plurality of APs send NDPs (the NDP does not include a PPDU of a data field, and is not a MAC frame), and the plurality of APs send BFRP trigger frames, to trigger a plurality of STAs to feed back beamforming reports.

The AP 2 and the AP 3 may carry the NDPAs, the NDPs, and/or the BFRP trigger frames to EHT PPDUs, and simultaneously send the NDPAs, the NDPs, and/or the BFRP trigger frames at a same frequency. Simultaneous transmission of the plurality of APs at the same frequency helps STAs at different locations receive frames sent by the plurality of APs.

It should be noted that, in the foregoing two examples, the beamforming reports sent by the plurality of STAs may be sent in an uplink orthogonal frequency division multiple access (UL OFDMA) manner, that is, the plurality of STAs may simultaneously send the beamforming reports at different frequencies, and each STA may independently select an initialization state of a scrambling code sequence.

Figures 19, 20:
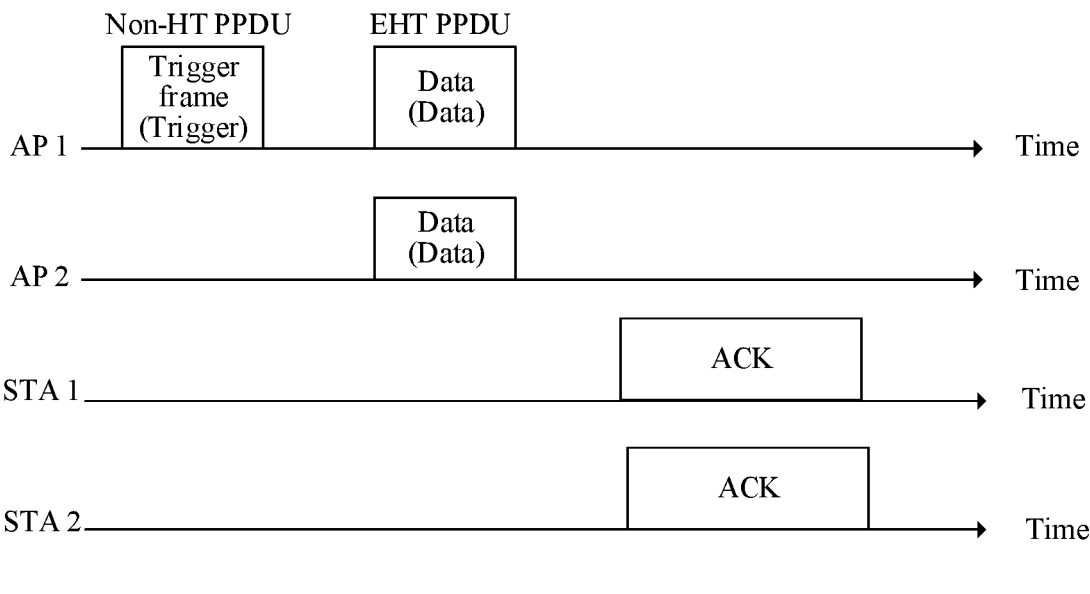
FIG. 19 is a diagram of a signal time sequence according to an embodiment of this application.
FIG. 20 is a diagram of a signal time sequence according to an embodiment of this application.

In still another example, a plurality of APs jointly perform joint sending or joint receiving. As shown in FIG. 19, an AP 1 may carry a trigger frame in a non-EHT PPDU (for example, a non-HT PPDU) for sending, and trigger an AP 1 and an AP 2 to carry data in EHT PPDUs and simultaneously send the data at a same frequency, so that a plurality of STAs acknowledge data sent by the plurality of APs, that is, the plurality of STAs send acknowledgment frames (ACK). Because the ACK frame is an acknowledgment of the STA for the data sent by the plurality of APs, content of the data jointly sent by the plurality of APs (which may include or may not include the AP 1) may be completely same, or the plurality of APs may perform distributed multiple-input multiple-output (D-MIMO), that is, the plurality of APs perform joint transmit end beamforming sending.

In yet another example, a plurality of APs jointly perform joint sending or joint receiving. As shown in FIG. 20, an AP 1 may carry a trigger frame in a non-EHT PPDU (for example, a non-HT PPDU) for sending, trigger an AP 2 and an AP 3 to carry data in EHT PPDUs, and simultaneously send the data at a same frequency, so that a plurality of STAs send ACK frames.

Figure 21:
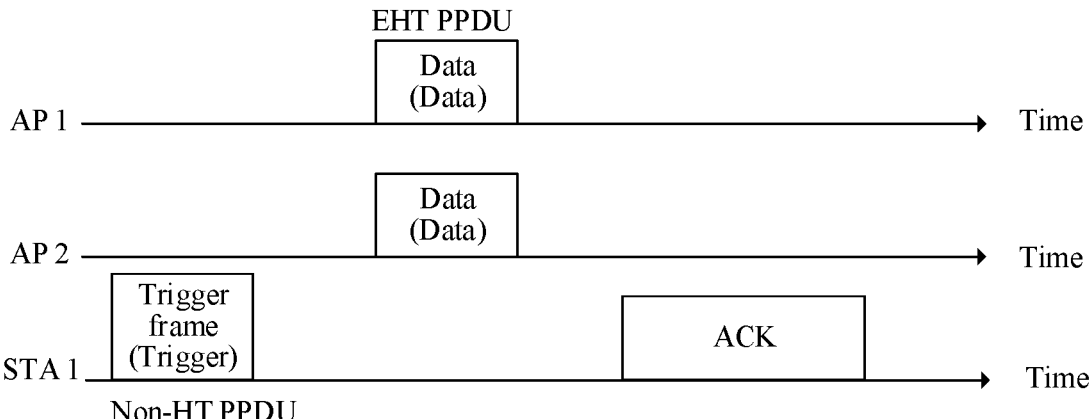
FIG. 21 is a diagram of a signal time sequence according to an embodiment of this application.

In further another example, a plurality of APs jointly perform joint sending or joint receiving. As shown in FIG. 21, a STA 1 may carry a trigger frame in a non-EHT PPDU (for example, a non-HT PPDU) for sending, trigger an AP 1 and an AP 2 to carry data in EHT PPDUs, and simultaneously send the data at a same frequency, so that the STA 1 acknowledges the data sent by the plurality of APs, that is, the STA sends an ACK frame.

It should be noted that, corresponding to that the sending device sends the non-EHT PPDU, and the receiving device or the sending device determines, based on the first field and the second field, the initialization state of the scrambling code sequence corresponding to the EHT PPDU, when the sending device sends the EHT PPDU, the receiving device may use the initialization state of the scrambling code sequence corresponding to the received EHT PPDU as the initialization state of the scrambling code sequence corresponding to the EHT PPDU sent by the receiving device, or the sending device may use the initialization state of the scrambling code sequence corresponding to the EHT PPDU as an initialization state of a scrambling code sequence corresponding to an EHT PPDU sent by the sending device next time, so that the initialization states of the scrambling code sequences corresponding to the EHT PPDUs simultaneously sent by the plurality of devices at the same frequency are the same, thereby ensuring that the EHT PPDUs simultaneously sent by the plurality of devices at the same frequency are the same, reducing signal interference, and improving communication reliability.

The solutions provided in embodiments of this application are mainly described above from a perspective of interaction between the devices. It may be understood that, to implement the foregoing functions, each device includes a corresponding hardware structure and/or a corresponding software module for performing each function. A person skilled in the art should easily be aware that, in combination with algorithms and operations in the examples described in embodiments of this disclosure, embodiments herein can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that this goes beyond the scope of this application.

In embodiments of this application, functional modules of each device may be divided based on the foregoing method example. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In some embodiments, another division manner may be used.

Figure 22:
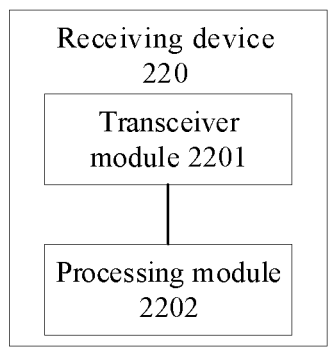
FIG. 22 is a diagram of a structure of a receiving device according to an embodiment of this application.

When each function module is obtained through division based on each corresponding function, FIG. 22 shows a receiving device 220. The receiving device 220 may include a transceiver module 2201 and a processing module 2202. For example, the receiving device 220 may be a receiving device, or may be a chip used in the receiving device or another combined device or component that has a function of the receiving device. When the receiving device 220 is a receiving device, the transceiver module 2201 may be a transceiver, and the transceiver may include an antenna, a radio frequency circuit, and the like. The processing module 2202 may be a processor (or a processing circuit), for example, a baseband processor, and the baseband processor may include one or more CPUs. When the receiving device 220 is a component that has a function of the receiving device, the transceiver module 2201 may be a radio frequency unit, and the processing module 2202 may be a processor (or a processing circuit), for example, a baseband processor. When the receiving device 220 is a chip system, the transceiver module 2201 may be an input/output interface of a chip (for example, a baseband chip), and the processing module 2202 may be a processor (or a processing circuit) of the chip system, and may include one or more central processing units. It should be understood that the transceiver module 2201 in this embodiment of this application may be implemented by a transceiver or a transceiver-related circuit component, and the processing module 2202 may be implemented by a processor or a processor-related circuit component (or referred to as a processing circuit).

For example, the transceiver module 2201 may be configured to perform all receiving and sending operations performed by the receiving device in embodiments shown in FIG. 10 to FIG. 21, and/or configured to support another process of the technology described in this specification. The processing module 2202 may be configured to perform operations other than the receiving and sending operations performed by the receiving device in embodiments shown in FIG. 10 to FIG. 21, and/or configured to support another process of the technology described in this specification.

In another possible embodiment, the transceiver module 2201 in FIG. 22 may be replaced with a transceiver, and a function of the transceiver module 2201 may be integrated into the transceiver. The processing module 2202 may be replaced with a processor, and a function of the processing module 2202 may be integrated into the processor. Further, the receiving device 220 shown in FIG. 22 may further include a memory. When the transceiver module 2201 is replaced with the transceiver, and the processing module 2202 is replaced with the processor, the receiving device 220 in this embodiment of this application may be the communication apparatus shown in FIG. 8.

Figure 23:
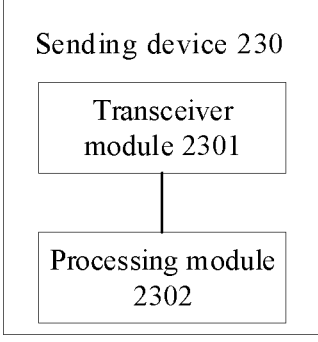
FIG. 23 is a diagram of a structure of a sending device according to an embodiment of this application.

When each function module is obtained through division based on each corresponding function, FIG. 23 shows a sending device 230. The sending device 230 may include a transceiver module 2301 and a processing module 2302. For example, the sending device 230 may be a sending device, or may be a chip used in the sending device or another combined device or component that has a function of the sending device. When the sending device 230 is a sending device, the transceiver module 2301 may be a transceiver, and the transceiver may include an antenna, a radio frequency circuit, and the like. The processing module 2302 may be a processor (or a processing circuit), for example, a baseband processor, and the baseband processor may include one or more CPUs. When the sending device 230 is a component that has a function of the sending device, the transceiver module 2301 may be a radio frequency unit, and the processing module 2302 may be a processor (or a processing circuit), for example, a baseband processor. When the sending device 230 is a chip system, the transceiver module 2301 may be an input/output interface of a chip (for example, a baseband chip), and the processing module 2302 may be a processor (or a processing circuit) of the chip system, and may include one or more central processing units. It should be understood that the transceiver module 2301 in this embodiment of this application may be implemented by a transceiver or a transceiver-related circuit component, and the processing module 2302 may be implemented by a processor or a processor-related circuit component (or referred to as a processing circuit).

For example, the transceiver module 2301 may be configured to perform all receiving and sending operations performed by the sending device in embodiments shown in FIG. 10 to FIG. 21, and/or configured to support another process of the technology described in this specification. The processing module 2302 may be configured to perform operations other than the receiving and sending operations performed by the sending device in embodiments shown in FIG. 10 to FIG. 21, and/or configured to support another process of the technology described in this specification.

In still another possible embodiment, the transceiver module 2301 in FIG. 23 may be replaced with a transceiver, and a function of the transceiver module 2301 may be integrated into the transceiver. The processing module 2302 may be replaced with a processor, and a function of the processing module 2302 may be integrated into the processor. Further, the sending device 230 shown in FIG. 23 may further include a memory. When the transceiver module 2301 is replaced with the transceiver, and the processing module 2302 is replaced with the processor, the sending device 230 in this embodiment of this application may be the communication apparatus shown in FIG. 8.

An embodiment of this application further provides a computer-readable storage medium. All or some of procedures in the foregoing method embodiments may be implemented by a computer program instructing related hardware. The program may be stored in the foregoing computer-readable storage medium. When the program is executed, the procedures in the foregoing method embodiments may be performed. The computer-readable storage medium may be an internal storage unit in the terminal in any one of the foregoing embodiments (including a data transmit end and/or a data receive end), for example, a hard disk or memory of the terminal. The foregoing computer-readable storage medium may also be an external storage device of the foregoing terminal, for example, a plug-in hard disk, a smart memory card (SMC), a secure digital (SD) card, and a flash card that are configured on the foregoing terminal. Further, the computer-readable storage medium may further include both an internal storage unit and an external storage device of the foregoing terminal. The computer-readable storage medium is configured to store the computer program and other programs and data required by the foregoing terminal. The computer-readable storage medium may be further configured to temporarily store data that has been output or is to be output.

It should be noted that, in the specification, claims, and accompanying drawings of this application, the terms "first", "second", and the like are intended to distinguish between different objects but do not indicate a particular order. In addition, terms such as "including" and "having" and any other variants thereof are intended to cover a non-exclusive inclusion. For example, a process, a method, a system, a product, or a device that includes a series of operations or units is not limited to the listed operations or units, but in some embodiments further includes an unlisted operation or unit, or in some embodiments further includes another inherent operation or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. A character "/" generally denotes an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

Based on the foregoing descriptions of the embodiments, a person skilled in the art may clearly understand that for the purpose of convenient and brief descriptions, division into the foregoing functional modules is merely used as an example for description. During actual application, the foregoing functions can be allocated to different functional modules based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division of the modules or units is merely logical function division, and may be another division in some embodiments. For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the operations of the methods described in embodiments of this application. The foregoing storage medium includes: any medium that can store program code, such as a USB flash drive, a removable hard disk, a ROM, a RAM, a magnetic disk, or an optical disc.

What is claimed is:

1. A method for determining an initialization state of a scrambling code sequence, comprising:

receiving, by a receiving device, a non-extremely-high throughput physical layer protocol data unit (non-EHT PPDU) from a sending device, wherein the non-EHT PPDU comprises a service field, the service field comprises a first field, a bit quantity of the first field is m, and m>1; and determining, by the receiving device, the initialization state of a scrambling code sequence corresponding to an extremely-high throughput physical layer protocol data unit (EHT PPDU) based on the first field, wherein a bit quantity of the initialization state of the scrambling code sequence is greater than the bit quantity of the first field.

2. The method according to claim 1, wherein determining the initialization state of the scrambling code sequence comprises:

obtaining, by the receiving device, a second field, wherein a bit quantity of the second field is a difference between the bit quantity of the initialization state of the scrambling code sequence and the bit quantity of the first field; and determining, by the receiving device, the initialization state of the scrambling code sequence corresponding to the EHT PPDU based on the first field and the second field.

3. The method according to claim 1, wherein the method further comprises:

determining, by the receiving device, the scrambling code sequence based on the initialization state of the scrambling code sequence;

performing, by the receiving device, scrambling processing based on the scrambling code sequence to generate the EHT PPDU; and sending, by the receiving device, the EHT PPDU.

4. The method according to claim 1, wherein the first field is a $1^{st}$ bit to an $m^{th}$ bit of the service field.

5. The method according to claim 2, wherein the second field is preconfigured.

6. The method according to claim 2, wherein the bit quantity of the initialization state of the scrambling code sequence is n, and the second field is an $(m+1)^{th}$ bit to an $n^{th}$ bit of the service field.

7. The method according to claim 2, wherein the second field is carried in the non-EHT PPDU.

8. The method according to claim 7, wherein the second field is carried in one or more of the following information of the non-EHT PPDU: a preamble, a media access control (MAC) frame, or a trigger frame.

9. The method according to claim 2, wherein the bit quantity of the initialization state of the scrambling code sequence is n, and the second field is n−m bits in m bits of the first field, wherein m≥n−m.

10. The method according to claim 1, wherein the bit quantity of the first field is 7.

11. The method according to claim 1, wherein the bit quantity of the initialization state of the scrambling code sequence is 11.

12. A communication apparatus comprising:

a processing device and executable instructions wherein the processing device is configured to execute the executable instructions, and in response to the processing device executing the instructions, the processing device performs operations comprising:

receiving a non-extremely-high throughput physical layer protocol data unit (non-EHT PPDU) from a sending device, wherein the non-EHT PPDU comprises a service field, the service field comprises a first field, a bit quantity of the first field is m, and m≥1; and determining an initialization state of a scrambling code sequence corresponding to an extremely-high throughput physical layer protocol data unit (EHT PPDU) based on the first field, wherein a bit quantity of the initialization state of the scrambling code sequence is greater than the bit quantity of the first field.

13. The communication apparatus according to claim 12, wherein the operations further include:

obtaining a second field, wherein a bit quantity of the second field is a difference between the bit quantity of the initialization state of the scrambling code sequence and the bit quantity of the first field; and determining the initialization state of the scrambling code sequence corresponding to the EHT PPDU based on the first field and the second field.

14. The communication apparatus according to claim 12, the operations further include:

determining the scrambling code sequence based on the initialization state of the scrambling code sequence;

performing scrambling processing based on the scrambling code sequence to generate the EHT PPDU; and sending the EHT PPDU.

15. The communication apparatus according to claim 12, wherein the first field is a $1^{st}$ bit to an $m^{th}$ bit of the service field.

16. The communication apparatus according to claim 13, wherein the second field is preconfigured.

17. The communication apparatus according to claim 13, wherein the bit quantity of the initialization state of the scrambling code sequence is n, and the second field is an $(m+1)^{th}$ bit to an $n^{th}$ bit of the service field.

18. The communication apparatus according to claim 13, wherein the second field is carried in the non-EHT PPDU.

19. The communication apparatus according to claim 13, wherein the bit quantity of the initialization state of the scrambling code sequence is n, and the second field is n−m bits in m bits of the first field, wherein m≥n−m.

20. A non-transitory computer-readable storage medium, wherein the non-transitory computer-readable storage medium stores executable instructions, and in response to the executable instructions being executed by a processing device, the processing device performs operations comprising:

receiving a non-extremely-high throughput physical layer protocol data unit (non-EHT PPDU) from a sending device, wherein the non-EHT PPDU comprises a service field, the service field comprises a first field, a bit quantity of the first field is m, and m≥1; and determining an initialization state of a scrambling code sequence corresponding to an extremely-high throughput physical layer protocol data unit (EHT PPDU) based on the first field, wherein a bit quantity of the initialization state of the scrambling code sequence is greater than the bit quantity of the first field.

* * * * *